(12) United States Patent
Colonna et al.

(10) Patent No.: US 10,182,273 B2
(45) Date of Patent: Jan. 15, 2019

(54) CONFIGURABLE SECURE MOBILE TOOL FOR AMI AND AMR METERING SYSTEMS

(71) Applicant: Honeywell International Inc., Morris Plains, NJ (US)

(72) Inventors: Donato Colonna, Raleigh, NC (US); William L. Hopper, Raleigh, NC (US); Fabio Cezar, Cary, NC (US); Sergei V Udin, Moscow (RU); Andrew Zhelezov, Troitsk (RU)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/943,139

(22) Filed: Apr. 2, 2018

(65) Prior Publication Data

US 2018/0227650 A1 Aug. 9, 2018

Related U.S. Application Data

(62) Division of application No. 15/211,700, filed on Jul. 15, 2016, now Pat. No. 9,955,239.

(51) Int. Cl.
| | |
|---|---|
| *G08C 15/06* | (2006.01) |
| *G08C 19/20* | (2006.01) |
| *H04Q 9/00* | (2006.01) |
| *H04L 29/06* | (2006.01) |
| *G06F 17/30* | (2006.01) |

(52) U.S. Cl.
CPC ......... *H04Q 9/00* (2013.01); *G06F 17/30867* (2013.01); *H04L 63/168* (2013.01); *H04Q 2209/40* (2013.01); *H04Q 2209/50* (2013.01); *H04Q 2209/60* (2013.01)

(58) Field of Classification Search
CPC ............................ G06F 21/57; G06Q 10/1095
USPC ..................................................... 340/870.03
See application file for complete search history.

(56) References Cited

U.S. PATENT DOCUMENTS

| | | | |
|---|---|---|---|
| 6,199,068 B1 * | 3/2001 | Carpenter | G01D 4/004 |
| 2007/0124262 A1 * | 5/2007 | Uy | G06Q 50/06 |
| | | | 705/412 |
| 2012/0078548 A1 * | 3/2012 | Salazar | G01D 4/02 |
| | | | 702/62 |

* cited by examiner

*Primary Examiner* — Fabricio R Murillo Garcia

(57) ABSTRACT

Disclosed herein are apparatuses, methods and systems for a configurable and secure mobile tool for Advanced Metering Infrastructure (AMI) and Automatic Meter Reading (AMR) metering systems, wherein the tool comprises a suite of mobile apps that run on a mobile device (e.g., tablet, smartphone) and have functionality to support the installation, maintenance, service, diagnostics and configuration of meters in AMI and AMR systems. The mobile app may remotely synchronize through a secure communication channel with a server in communication with a database that contains configuration settings and related data created by an administrator utilizing an administrator station. During synchronization, the mobile app functionality is configured and customized based on user group authorization profiles defined by an administrator, and data collected and generated by the mobile app that is stored on the mobile device is transferred to the database where it may be accessed by an administrator station.

19 Claims, 21 Drawing Sheets

| # | Model | MeterID | Date/Time | Type | Location | Photo |
|---|---|---|---|---|---|---|
| 1 | A3R | A3R_Demo_1 | 12/31/12 7:34:47 PM | | ◎ | 🖼 |
| 2 | REXU | REXU_Demo_2 | 12/31/12 7:34:46 PM | | ◎ | 🖼 |
| 3 | REX2 | REX2_Demo_3 | 12/31/12 7:34:45 PM | | | 🖼 |
| 4 | REXU | 17034001 | 1/8/16 11:03:23 AM | | | |
| 5 | A3R | 16672620 | 1/8/16 11:44:44 AM | | | |
| 6 | REXU | 17033459 | 1/8/16 11:39:17 AM | | | |
| 7 | A3R | 13998321 | 1/8/16 11:46:29 AM | | | |
| 8 | REXU | 17033462 | 1/8/16 11:54:38 AM | | | |

FIG. 16

CONFIGURABLE SECURE MOBILE TOOL FOR AMI AND AMR METERING SYSTEMS

CROSS-REFERENCE TO RELATED APPLICATIONS

This application is a divisional application of U.S. patent application Ser. No. 15/211,700, filed Jul. 15, 2016, now allowed, entitled "Configurable Secure Mobile Tool For AMI And AMR Metering Systems." The entirety of which is incorporated by reference herein for all purposes.

TECHNICAL FIELD

The present disclosure relates tools for installation, maintenance, service, diagnostics and configuration of meters in metering systems, and more particularly, to apparatuses, methods and systems for a configurable and secure mobile tool for installation, maintenance, service, diagnostics and configuration of meters in Advanced Metering Infrastructure (AMI) and Automatic Meter Reading (AMR) systems.

BACKGROUND

A Utility deploying an Advanced Metering Infrastructure (AMI) or Automatic Meter Reading (AMR) system uses a set of software tools to perform the installation, maintenance, service, diagnostics and configuration of the metering endpoints (meters). Each tool has a different interface, different data format, and often duplicated configuration that an administrator needs to create for the different tools. These tools run on legacy handheld devices which are expensive and have low performance and usability compared to modern mobile devices (e.g., tablets, smartphones). Also, different tools are usually required for the different operations (i.e., a tool for installation, a tool for maintenance) and each tool requires individual setup on each handheld device. Usually the transfer of the data to and from the handheld device (e.g. data acquired during field service) requires the handheld to be physically docked to a hard-wired connection on some local desktop computer or server which then publishes the data for an administrator. Accordingly, the management of the AMI/AMR system is often complex and expensive due to the need for many tools, the complex and expensive setup required for each one, the support required for legacy low-performance and low-usability handheld devices, and the fact that the data can be transmitted back to the utility office only by docking the handheld device to a hard-wired local connection.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Disclosed herein are apparatuses, methods and systems for a configurable and secure mobile tool for installation, maintenance, service, diagnostics and configuration of meters in Advanced Metering Infrastructure (AMI) and Automatic Meter Reading (AMR) systems. In one embodiment, the mobile tool for performing at least one of installation, maintenance, service, diagnostics and configuration of meters includes: a display, at least one communication module, memory, and a processor. When the processor executes computer-executable instructions stored in the memory, it causes the mobile tool to: establish communications with a server, receive from the server configuration settings and related data, based on a user group authorization profile, and automatically configure the mobile tool based on the received configuration settings and related data. The configuration authorizes the mobile tool to perform at least a subset of operations with respect to a meter. In addition, when the processor executes computer-executable instructions stored in the memory, it causes the mobile tool to establish a connection with the meter to perform one or more of the authorized operations.

In another embodiment, a server for securely and remotely configuring a mobile tool includes: a communication network interface, a database, a processor, and memory. The memory stores computer-executable instructions that when executed by the processor cause the server to: receive a request from the mobile tool, establish a secure communication channel with the mobile tool, determine from user login information received from the mobile tool a user group authorization profile associated with a user of the mobile tool, retrieve configuration settings and related data from the database based on the determined user group authorization profile, and transmit to the mobile tool, via the communication network interface, the configuration settings and related data. The mobile tool is thereby automatically configured and authorized to perform at least a subset of operations with respect to a meter with which the mobile tool interacts.

In another embodiment, an administrator station for establishing user group authorization profiles for mobile tools used for performing at least one of installation, maintenance, service, diagnostics and configuration of meters includes a processor and memory. The memory stores computer-executable instructions that when executed by the processor, cause the administrator station to receive input for: at least one user, including a username and a password for the at least one user; at least one user group, including a user group name, user group membership information identifying the at least one user, privileges assigned to the at least one user group, and authorized data for the at least one user group. The computer executable instructions executed by the processor cause the administrator station to process the input and to generate a user group authorization profile for the at least one user group that stores the user group name, the user group membership information, privileges, and authorized data in a database.

This Summary is provided to introduce a selection of concepts in a simplified form that are further described below in the Description of Illustrative Embodiments section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein:

FIG. 16 illustrates another exemplary computer user interface for the mobile tool according to an embodiment of the disclosure.

DESCRIPTION OF ILLUSTRATIVE EMBODIMENTS

Disclosed herein are apparatuses, methods and systems for a configurable and secure mobile tool for Advanced Metering Infrastructure (AMI) and Automatic Meter Reading (AMR) systems, wherein the tool comprises a suite of mobile applications (mobile app(s)) that run on a mobile device (e.g., tablet, smartphone) and are configured to have the functionality to support the installation, maintenance, service, diagnostics and configuration of meters in AMI and AMR systems. The mobile tool synchronizes with a server through a secure communication channel. The server is in communication with a database that contains user group authorization profiles. The user group authorization profiles contain configuration settings and related data defined by an administrator using an administrator station. During synchronization, the server determines the mobile tool user's user group authorization profile from the user's login credentials and transmits configuration settings and related data to the mobile tool based on the user's user group authorization profile. As such, the server automatically configures the mobile tool and enables an administrator to control the functionality of the mobile tool and how it can interact with a meter. Also during synchronization, data collected and generated by the mobile tool that is stored on the mobile device may be transferred to the server and stored in the database. All data in the database may be accessed from an administrator station and the server may be configured to allow access to data in the database for other AMI and/or AMR applications (e.g., a route manager for mobile users, a web-based interface to view and/or create at least a subset of the data).

Figure 1:
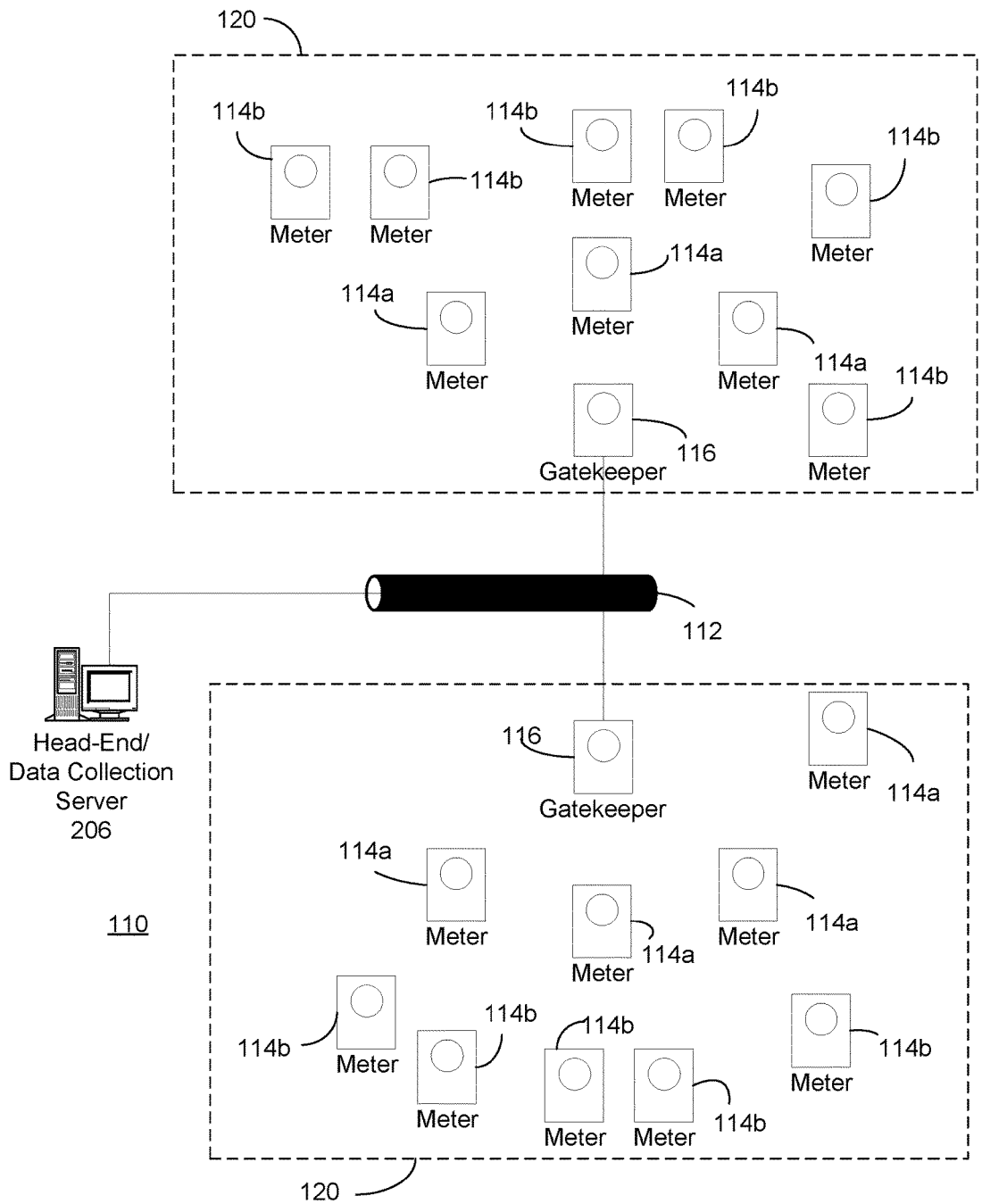
FIG. 1 illustrates one example metering system.

FIG. 1 illustrates one example of a metering system 110 comprising a plurality of meters 114, in which the apparatuses, methods and systems disclosed herein may be employed. Meters 114 are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, such as interval data, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters, while meters that are only capable of transmitting data may be referred to as "transmit-only" or "one-way" meters. In bi-directional meters, the circuitry for transmitting and receiving may comprise a transceiver.

System 110 further comprises gatekeepers 116, in which the apparatuses, methods and systems disclosed herein may be employed. In one embodiment, gatekeepers 116 are also meters operable to detect and record usage of a service or commodity such as, for example, electricity, water, or gas. In addition, gatekeepers 116 are operable to send data to and receive data from meters 114. Thus, like the meters 114, the gatekeepers 116 may comprise both circuitry for measuring the consumption of a service or commodity and for generating data reflecting the consumption and circuitry for transmitting and receiving data. In one embodiment, gatekeeper 116 and meters 114 communicate with and amongst one another using any one of several wireless techniques such as, for example, frequency hopping spread spectrum (FHSS) and direct sequence spread spectrum (DSSS).

A gatekeeper 116 and the meters 114 with which it communicates may define a subnet/LAN 120 of system 110. As used herein, meters 114 and gatekeepers 116 may be referred to as "metering endpoints," "metering devices" or "meter devices" in the subnet 120. In each subnet/LAN 120, each meter transmits data related to consumption of the commodity being metered at the meter's location. The gatekeeper 116 receives the data transmitted by each meter 114, effectively "collecting" it, and then periodically transmits the data from all of the meters in the subnet/LAN 120 to a data collection server or head-end system 206. The data collection server 206 stores the data for analysis and preparation of bills, for example. The data collection server 206 may be a specially programmed general purpose computing system and may communicate with gatekeepers 116 via a network 112. The network 112 may comprise any form of network, including a wireless network or a fixed-wire network, such as a local area network (LAN), a wide area network (WAN), the Internet, an intranet, a telephone network, such as the public switched telephone network (PSTN), a Frequency Hopping Spread Spectrum (FHSS) radio network, an ISM mesh network, a Wi-Fi (802.11) network, a Wi-Max (802.16) network, a land line (POTS) network, a cellular network, or any combination of the above.

Figure 2A:
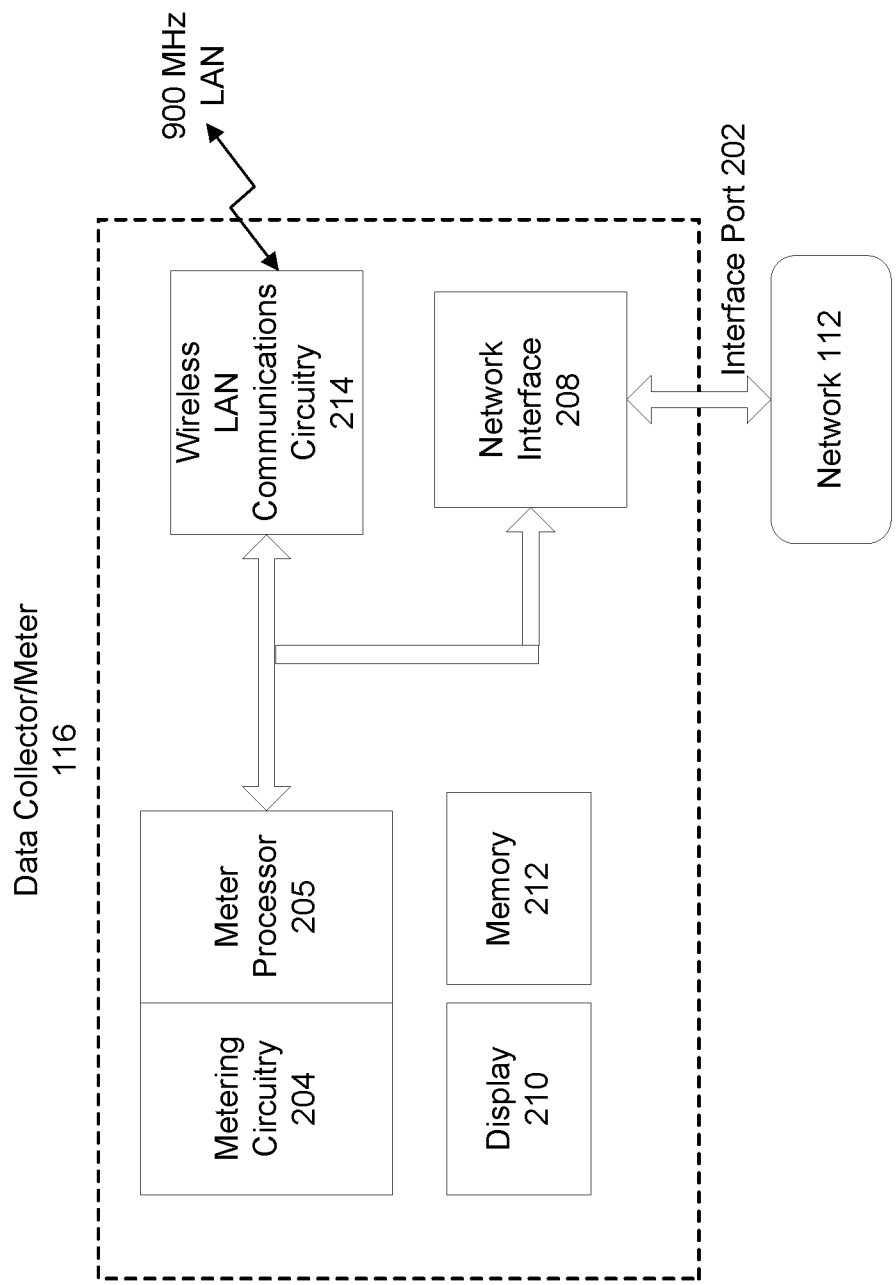
FIG. 2A illustrates a schematic of a gatekeeper device/meter, according to an aspect of the disclosure.

FIG. 2A is a block diagram illustrating further details of one embodiment of a gatekeeper 116. Although certain components are designated and discussed with reference to FIG. 2A, it should be appreciated that the invention is not limited to such components. In fact, various other components typically found in an electronic meter may be a part of gatekeeper 116, but have not been shown in FIG. 2A for the purposes of clarity and brevity. The components that are shown and the functionality described for gatekeeper 116 are provided as examples, and are not meant to be exclusive of other components or other functionality.

As shown in FIG. 2A, gatekeeper 116 may comprise metering circuitry 204 that performs measurement of consumption of a service or commodity and a processor 205 that controls the overall operation of the metering functions of the gatekeeper 116. The gatekeeper 116 may further comprise a display 210 for displaying information such as measured quantities and meter status and a memory 212 for storing data. The gatekeeper 116 further comprises wireless LAN communications circuitry 214 for communicating wirelessly with the meters 114 in a subnet/LAN and a mobile tool, and a network interface 208 for communication over the network 112. The gatekeeper 116 may further comprise an optical interface (not shown) for connecting a mobile tool or similar device directly to the gatekeeper 116.

In one embodiment, the wireless LAN communications circuitry 214 may be implemented by a 900 MHz two-way radio (i.e., transceiver) installed within the meter, and the network interface 208 may be implemented by a telephone modem or the like also installed within the meter. In another embodiment, the wireless LAN communications circuitry 214 may be implemented by a cellular wireless and/or Ethernet network interface module. The network interface 208 routes messages from network 112 (via interface port 202) to either the meter processor 205 or the LAN communications circuitry. The gatekeeper 116 typically has sufficient memory to store data received from meters 114. This data may include, but is not limited to the following: current billing data (e.g., the present values stored and displayed by meters 114), previous billing period data, previous season data, interval data, and load profile data.

Figure 2B:
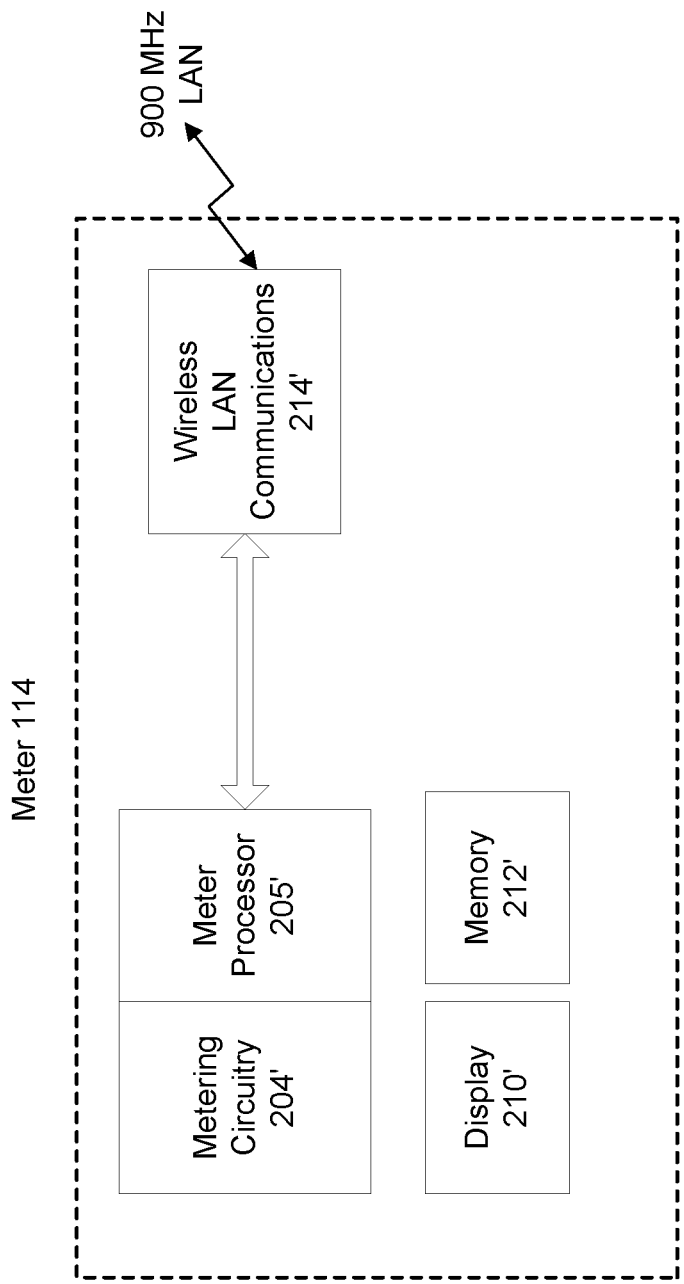
FIG. 2B illustrates a schematic of a meter device, in which the apparatuses, methods and systems disclosed herein may be employed.

FIG. 2B is a block diagram of an exemplary embodiment of a meter 114 that may operate in the system 110 of FIG. 1. As shown, the meter 114 comprises metering circuitry 204' for measuring the amount of a service or commodity that is consumed and circuitry for generating data reflecting the consumption, a processor 205' that controls the overall functions of the meter, a display 210' for displaying meter data and status information, and a memory 212' for storing data and program instructions. The meter 114 may further comprise wireless communications circuitry 214' for transmitting and receiving data to/from other meters 114, a gatekeeper 116, and/or a mobile tool. The meter 114 may further comprise an optical interface (not shown) for connecting a mobile tool or similar device directly to the gatekeeper 114.

The gatekeeper 116 is responsible for managing, processing and routing data communicated between the gatekeeper and network 112 and between the gatekeeper and meters 114. Gatekeeper 116 may continually or intermittently receive current data from meters 114 and store the data in memory 212 or a database (not shown) in gatekeeper 116. Such current data may include but is not limited to the total kWh usage, the Time-Of-Use (TOU) kWh usage, peak kW demand, interval data, and other energy consumption measurements and status information. Gatekeeper 116 also may receive and store previous billing and previous season data from meters 114 and store the data in memory 212 or the database in gatekeeper 116. The database may be implemented as one or more tables of data within the gatekeeper 116.

In an embodiment, the metering system 110 may be an Advanced Metering Infrastructure (AMI) system which uses the ANSI C12.22 protocol for communications among meter devices 114/116 and the head-end system 206. Other protocols, however, could be employed.

In another embodiment, a metering system may comprise metering endpoints that include a network interface (e.g. a telephone modem, or a WAN module such as a cellular modem) for communication over a network directly to a server. In another embodiment, the gatekeeper 116 in metering system 110 may be replaced by a communication router that does not collect and store any meter data but rather transmits meter data to a data collection server or head end system 206 via network 212.

As used herein, the following capitalized terms have specifically defined meanings. A Task implements a specific sequence of operations (typically ANSI C12.19 services) that the mobile tool will send to a connected meter to achieve a particular result. The connected meter responds by executing a procedure to achieve the desired result. Generally, Tasks are for reading specific meter data (i.e., read some specific tables), configuring specific meter parameters (i.e. write some specific tables), and/or performing some commands (e.g., change meter time, execute a demand reset). A Function is a Task or a sequence of Tasks. A Program specifies the full configuration of a meter and controls how the meter operates (e.g., which options are enabled). A Program is a set of Components. A Component is a set of meter configuration parameters grouped according to specific functionality (e.g., a Component may define the meter's log entries).

Figure 3:
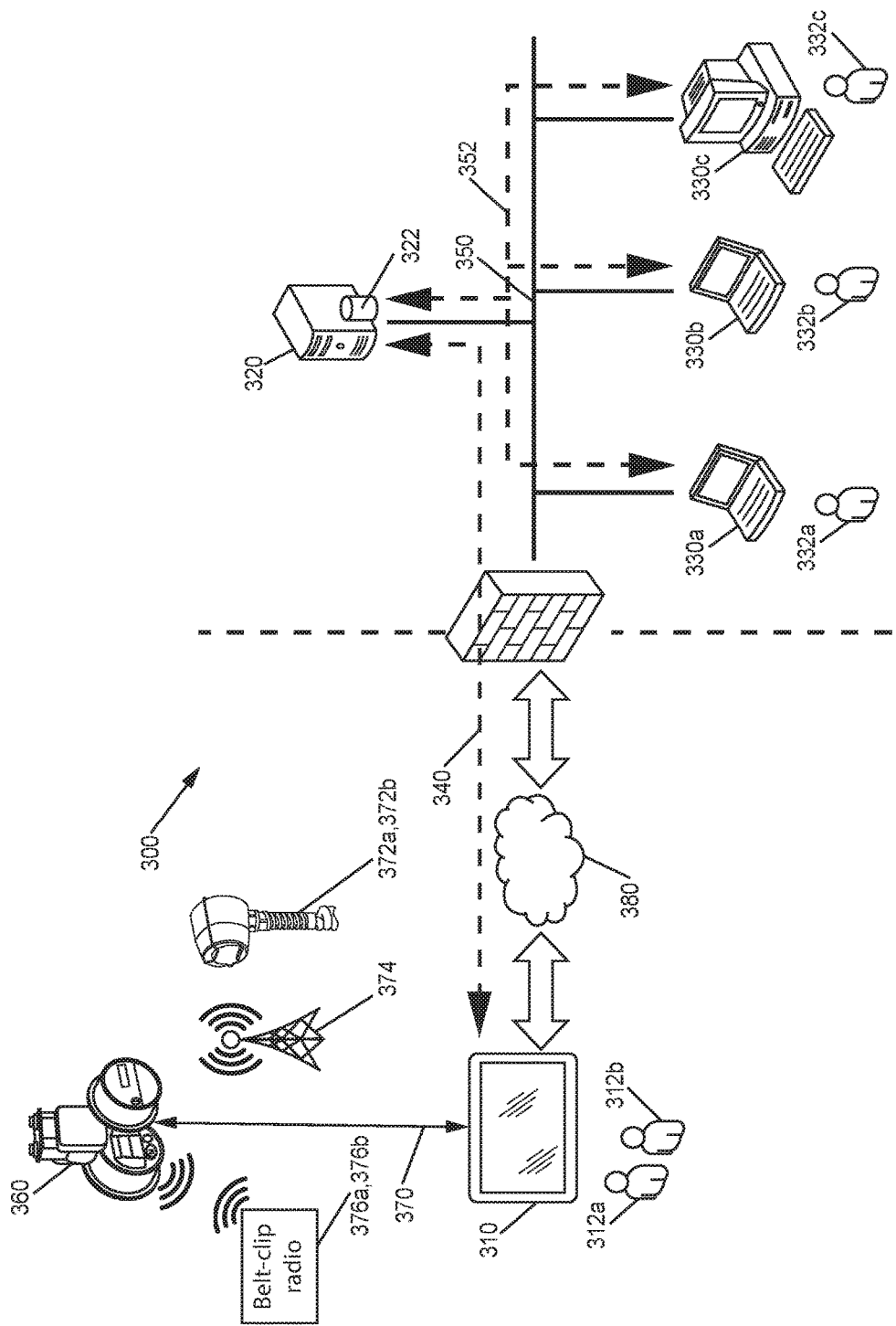
FIG. 3 illustrates a schematic diagram of a configurable secure mobile tool system according to an embodiment of the disclosure.

FIG. 3 illustrates a configurable and secure mobile tool system 300 according to one embodiment of the disclosure. Mobile tool system 300 consists of a mobile device 310 (e.g., tablet, smartphone in FIG. 20) that includes memory, a processor, a display, and at least one communication module. The mobile device 310 is configured to run one or more mobile apps. A user may launch a mobile app on the mobile device and enter user credentials (e.g., username and password). The mobile tool communicates with a server 320 (e.g., a computing environment in FIG. 21) over a network 380 (e.g., Internet) using a communication module in the mobile device 310 (e.g., Wi-Fi, cellular radio). The server 320 and mobile tool establish a secure communication channel 340 (e.g., a server operating HTTPS protocol, a VPN connection).

The server 320 is connected to a network 350 (e.g. Internet) and able to communicate with a database 322. In one embodiment, the server 320 hosts database 322. In an alternative embodiment, the server 320 is communicatively linked to a network database 322. The database 322 is configured to store configuration settings and related data for the mobile tool, as well as meter data collected and generated by the mobile tool. The server 320 and database 322 allow for centralized administration of the mobile tool system 300.

An administrator 332a, 332b, 332c uses an administrator station 330a, 330b, 330c (e.g., a computing environment in FIG. 21) to define user group authorization profiles, which contain configuration settings and related data for the mobile tool. The administrator station 330a, 330b, 330c is connected to the network 350 and configured to communicate with server 320 and to store configuration settings and related data on the database 322.

After the server 320 and mobile tool establish a secure communication channel 340, the mobile tool synchronizes with the server 320. During synchronization, the server 320 determines the mobile tool user's user group authorization profile and retrieves configuration settings and related data from the database 322 based on the determined user group authorization profile. The server 320 then transmits the configuration settings and related data (e.g., meter passwords; Functions; meter Programs and related Components) to the mobile tool via the secure communication channel 340. The server thereby automatically configures the mobile tool and enables an administrator to control the functionality of the mobile tool and how it can interact with a meter (e.g., ability to perform specific meter installation, maintenance, service, diagnostics and configuration operations). Also during synchronization, data collected and generated by the mobile tool that is stored on the mobile device 310 may be transferred to the server 320 via the secure communication channel 340 and stored on the database 322 where it may be accessed from an administrator station.

In one embodiment, the mobile tool supports one or more communication channels and protocols 370 that enable it to connect to meters 360. FIG. 3 illustrates exemplary communication channels and protocols 372a, 372b, 374, 376a, 376b. As shown, the mobile tool may connect to the meter via an optical probe 372a, 372b that communicates with an optical interface of the meter and may be connected to the mobile device USB interface or Bluetooth interface, respectively. For meters equipped with cellular wireless or Ethernet interface modules, the mobile tool may support communication via TCP/IP (IPV4 and IPV6) channels utilizing the mobile device cellular wireless and/or Wi-Fi communication modules. For meters connected to a vendor proprietary mesh network, the mobile tool may support communication via vendor specific interface cards 376a, 376b (e.g., a radio) that communicate with the meter via a network communication protocol and may be connected to the mobile device USB or Bluetooth interface, respectively. Once connected, the mobile tool may perform an authorized operation.

FIGS. 4-11 illustrate exemplary embodiments of a computer user interface for the administrator station. The administrator station enables an administrator to create and modify user groups and users, assign a user to a particular user group, and to customize and control particular user group functionality and authorization for interacting with a meter by defining user group authorization profiles. An administrator may also use the administrator station to configure user login credentials (e.g., user name and password). In addition, an administrator may use the administrator station to perform other exemplary operations, including to create Functions, meter Programs, meter password sets, and meter configuration Components. In one embodiment, the administrator station is a desktop application. In an alternative embodiment, the administrator station is a web-based application. In another embodiment, the administrator station is a web-based application hosted by the server.

The administrator station is configured to be in communication with the server and database. In one embodiment, all administrative settings, including the user group authorization profiles and information associated with them, are stored in a SQL database. In alternative embodiments, other database technologies may be used.

Figure 4:
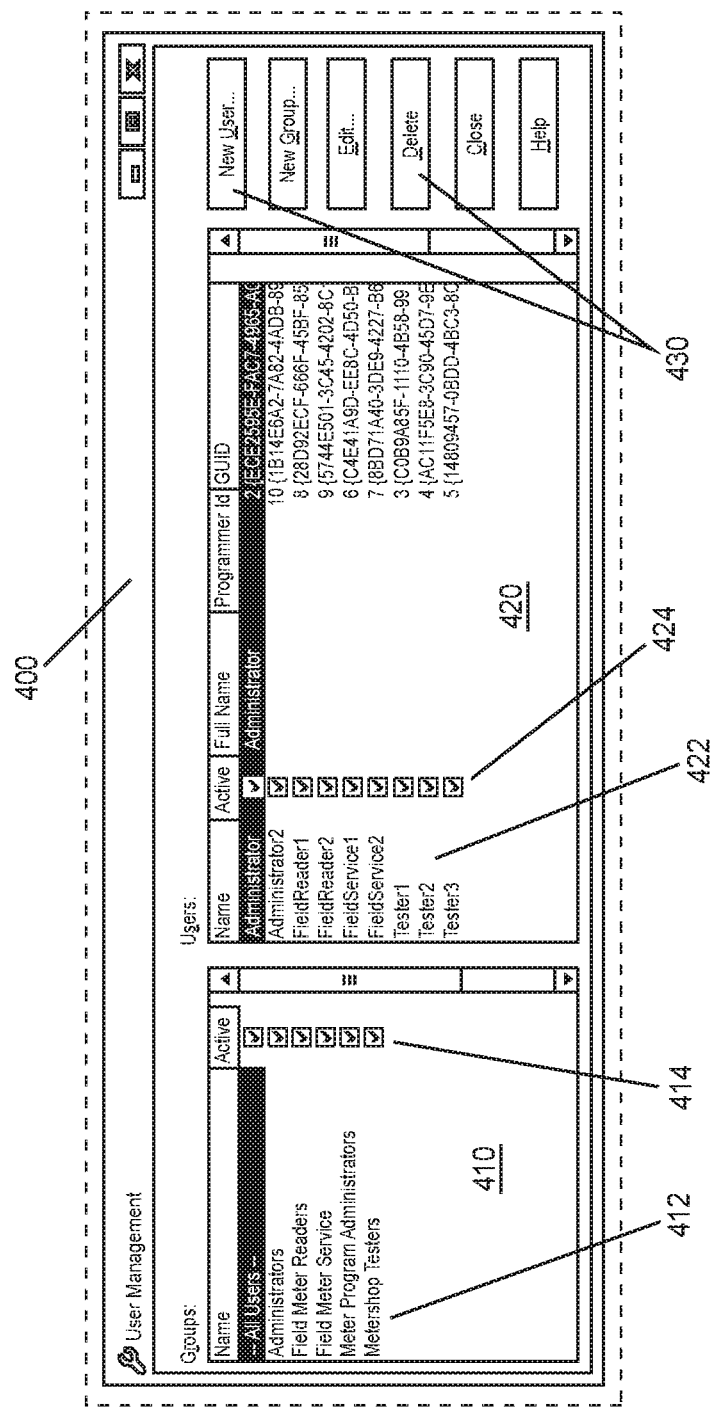
FIG. 4 illustrates an exemplary computer user interface for an administrator station of the system of FIG. 3, according to an embodiment of the disclosure.

FIG. 4 illustrates an administrator station user interface for user management. An administrator may use the administrator station to create and edit user groups and users. As shown, the interface 400 includes a first window 410 that displays a list of available user groups 412, a second window 420 that displays a list of available users 422, and provides a series of buttons 430 to create, edit, and delete user groups and users. The interface 400 may also include a series of checkboxes 414 for the list of user groups 412 to selectively activate the respective user groups. Similarly, the interface 400 may include a series of checkboxes 424 for the list of users 422 to selectively activate the respective users.

User groups and users may include administrators who login to the administrator station, and mobile users who use the mobile tool to interact with meters and authenticate on the server. FIG. 4 illustrates exemplary user groups, including administrators, Field Meter Readers, Field Meter Service, Meter Program administrators, and Metershop Testers. Exemplary users include administrator, administrator2, FieldReader1, FieldReader2, FieldService1, FieldService2, Tester1, Tester2, and, Tester3.

As discussed in greater detail below, the user groups may be configured and customized to allow for various levels of functionality and authorization for interacting with and controlling the administrator station and meters. By way of example, the user groups identified in in FIG. 4 may be configured to achieve the following functionality:

Administrators: have full privileges and total access to the administrator station (e.g., may create and modify other user groups and users, may configure user group authorization profiles, may control meter configuration (e.g., create and modify Functions, components, Programs, and meter passwords), and access data transmitted from the mobile tool to the server).

Meter Program Administrator: has limited privileges and reduced access to the administrator station (e.g., may create, modify, and authorize Programs for other users).

Field Meter Readers: use the mobile tool to interact with meters, but have limited privileges and authorization (e.g., may only execute Read Functions and use meter password with read-only meter access).

Field Meter Service: uses the mobile tool to interact with meters and has additional privileges and authorization compared to Field Meter Readers (e.g., may execute more Functions and use meter password with unrestricted meter access).

Metershop Testers: use the mobile tool to interact with meters and have additional privileges and authorization compared to Field Meter Readers and/or Field Meter Service (e.g., may reconfigure the meter and use meter password with unrestricted meter access).

Figure 5:
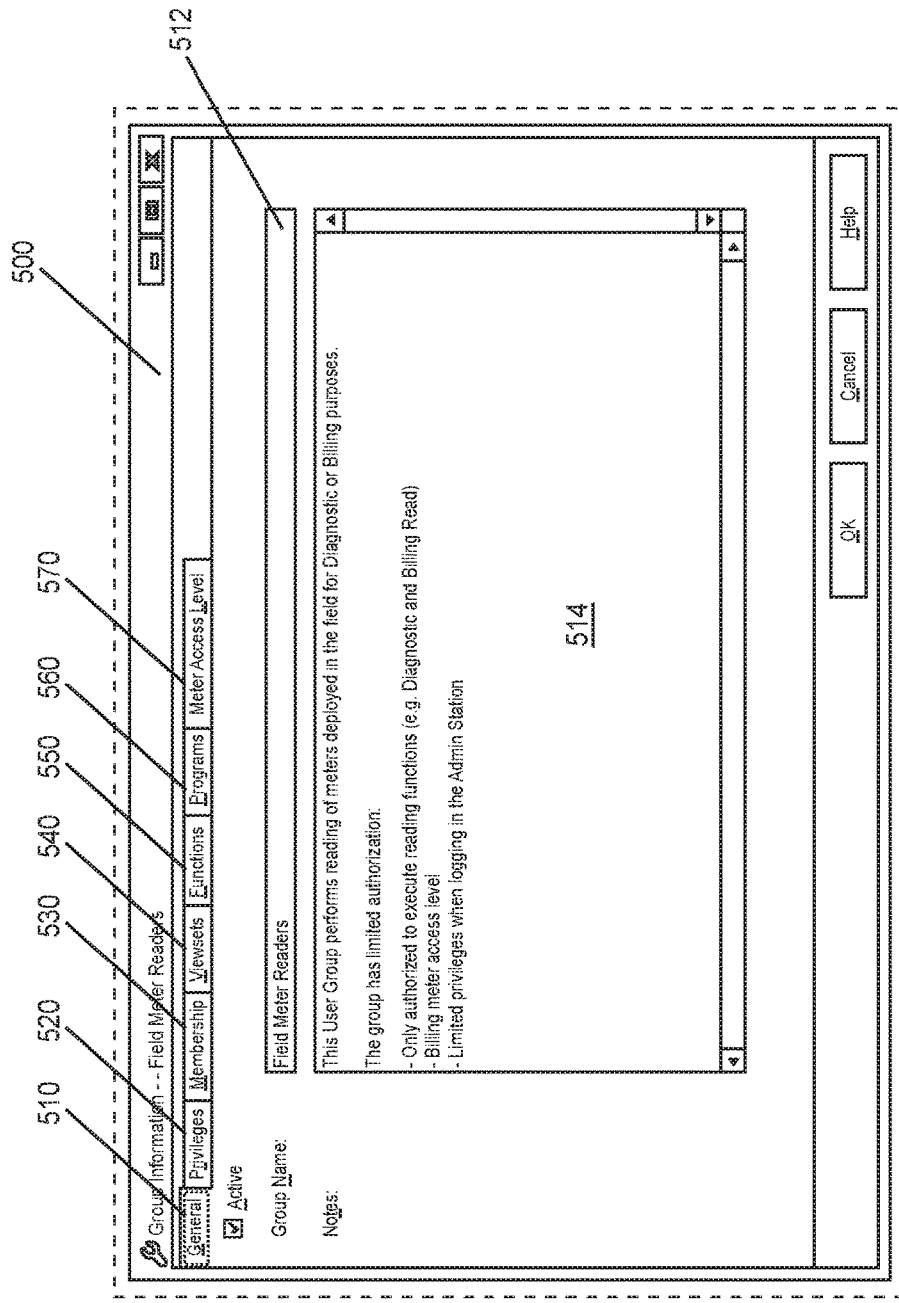
FIG. 5 illustrates an exemplary computer user interface for the administrator station according to an embodiment of the disclosure.
Figure 7:
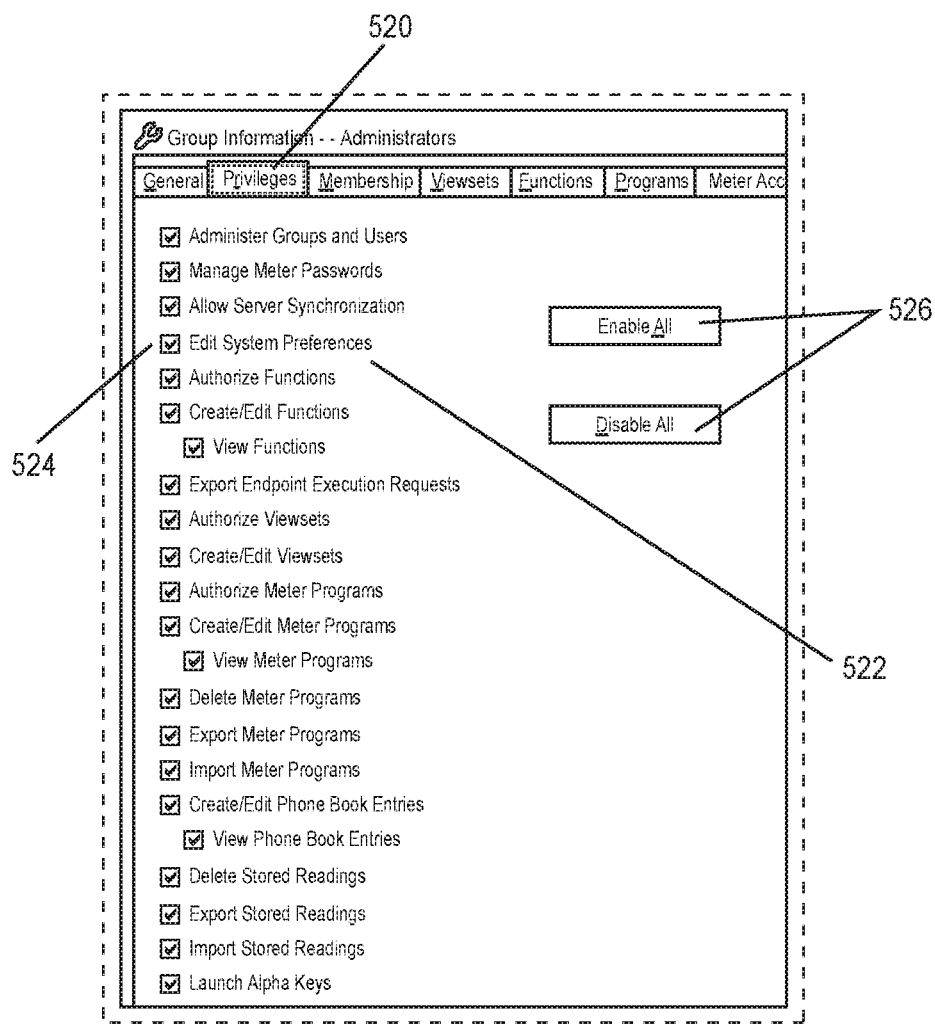
FIG. 7 illustrates another exemplary computer user interface for the administrator station according to an embodiment of the disclosure.

FIG. 5 illustrates an exemplary administrator station user interface 500 that may be used to configure user group authorization profiles. The interface 500 provides the ability to control user membership 530 and to assign a user or users to a particular user group. The interface 500 also provides the ability to customize and control particular user group functionality and authorization for interacting with a meter by configuring user group authorization profiles. The interface 500 provides the ability to configure a user group authorization profile by setting privileges and authorized data for each user group. FIG. 7 illustrates a user interface 520 for configuring privileges. Exemplary privileges include: create/edit Programs, view Programs, authorize Programs, create/edit Functions, view Functions, and authorize Functions. FIGS. 8-11 illustrate user interfaces 540, 550, 560, 570 for configuring authorized data. Exemplary authorized data includes specifically selected and defined Viewsets, Functions, Programs, and Meter Access Level.

Figure 6:
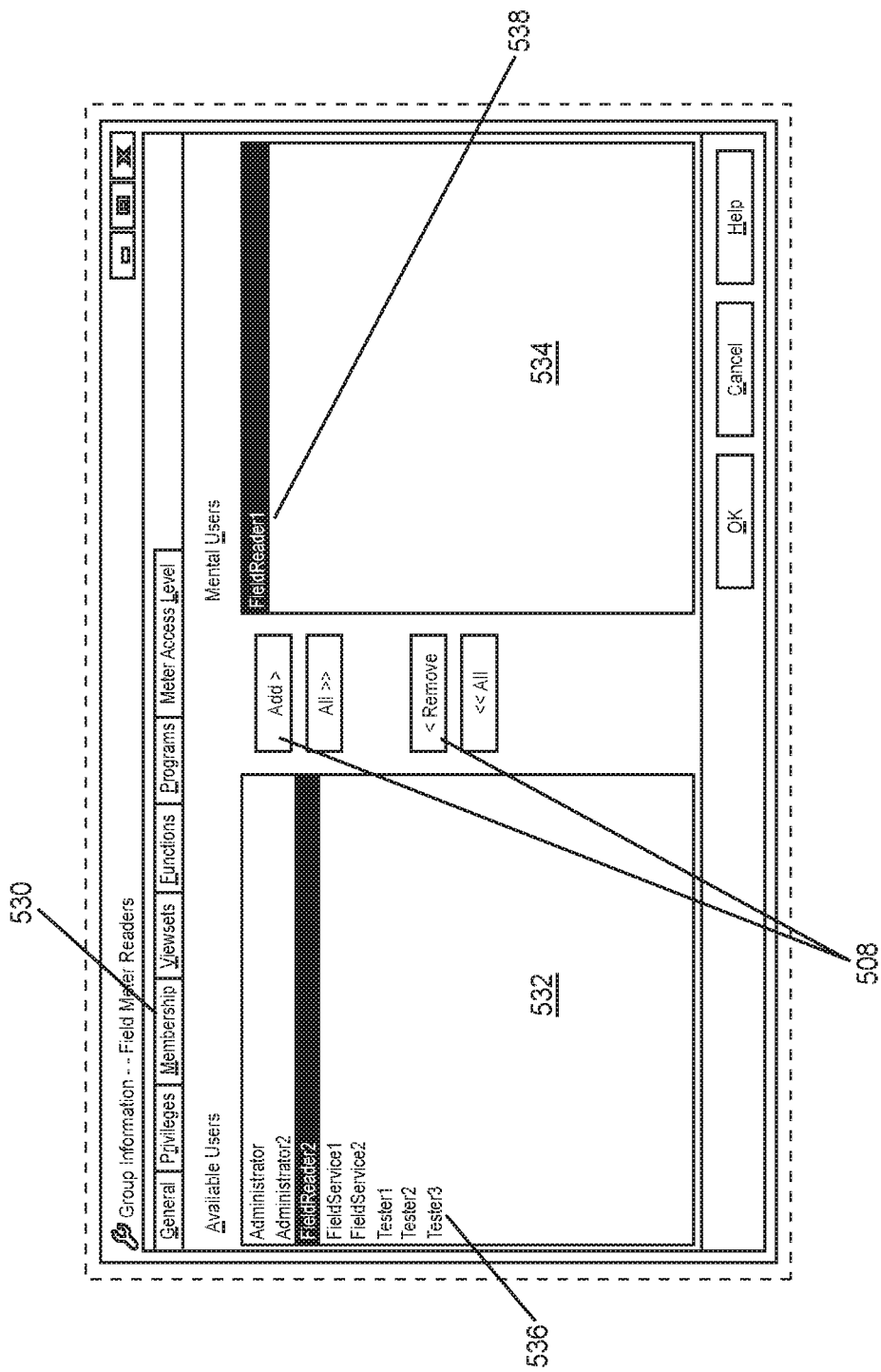
FIG. 6 illustrates another exemplary computer user interface for the administrator station according to an embodiment of the disclosure.

An administrator may also use the administrator station to modify user group membership. For example, FIG. 6 illustrates a user interface 530 for controlling the users in the Field Meter Readers user group. As can be seen, the interface 530 includes a first window 532 that displays a list of available users 536, a second window 534 that displays users assigned to the Field Meter Readers user group 538, and provides a series of buttons 508 to add or remove users for the user group.

Each user group may be configured with privileges to achieve the desired user group functionality. FIG. 7 illustrates a user interface 520 for configuring privileges enabled for an Administrators user group. The user interface has a list of available privileges 522 and provides a series of checkboxes 524 to select the specific privileges enabled for the user group. As shown in FIG. 7, the Administrators user group has all privileges enabled, thereby having full access to the administrator station. For other user groups, a limited number of privileges may be enabled to customize and control the user groups' functionality with respect to the administrator station and mobile tool.

Figure 8:
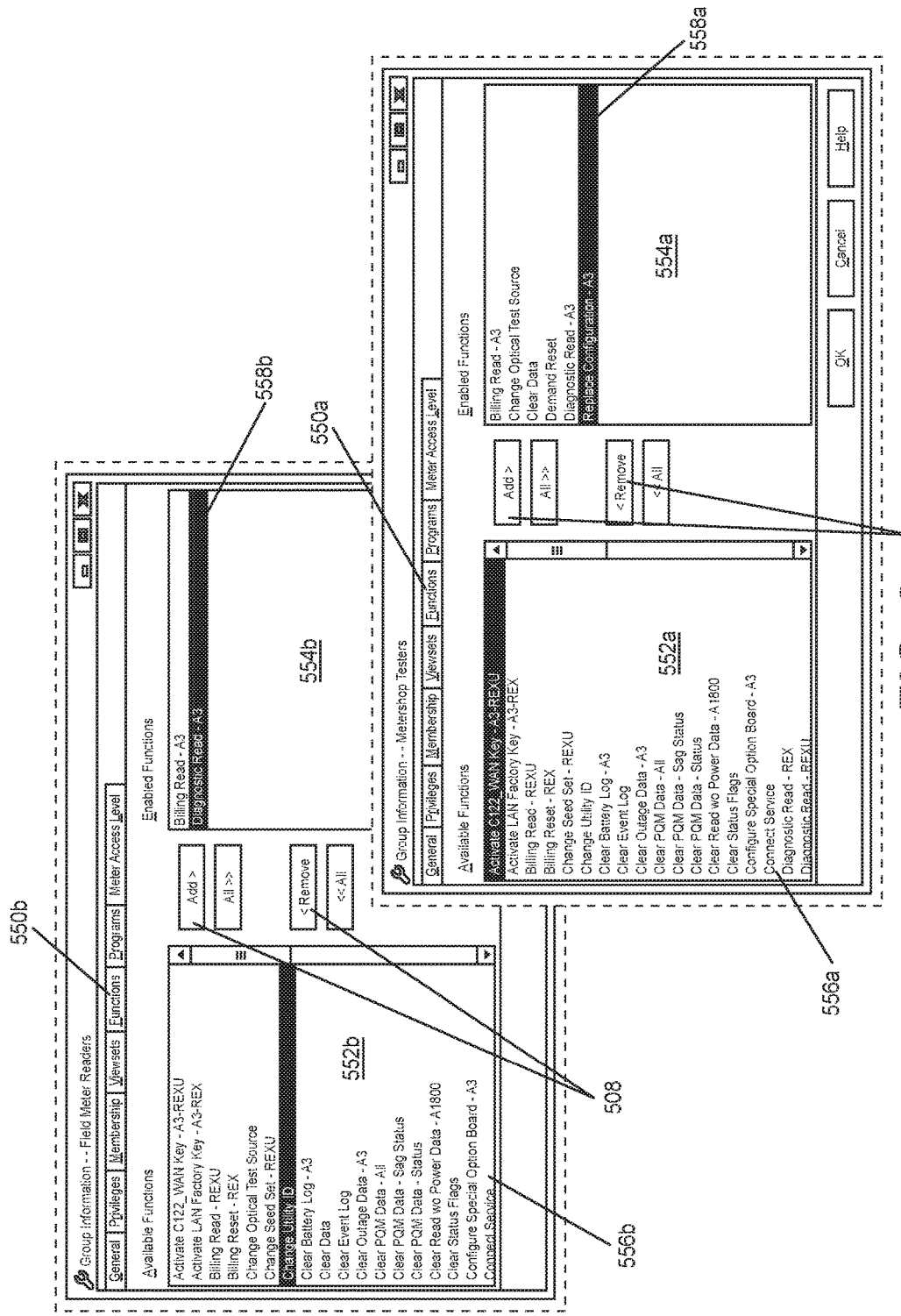
FIG. 8 illustrates another exemplary computer user interface for the administrator station according to an embodiment of the disclosure.

The Functions that a user group is authorized to perform using the mobile tool may be selected and customized to control how the user group, user, and mobile tool interact with a meter. FIG. 8 illustrates examples of a user interface 550a, 550b to select the authorized Functions for two different user groups—Metershop Testers and Field Meter Readers. As shown, each user interface has a first window 552a, 552b that displays a list of available Functions 556a, 556b, a second window 554a, 554b that displays the Functions enabled for the respective user group 558a, 558b, and buttons 508 to add or remove Functions for the user group. As shown in FIG. 8, the Field Meter Readers user group is only authorized to perform A3 meter read Functions 558b. The Metershop Testers user group, however, is authorized to perform other Functions (e.g., Clear Data, Demand Reset) in addition to the A3 meter read Functions 558a.

Figure 9:
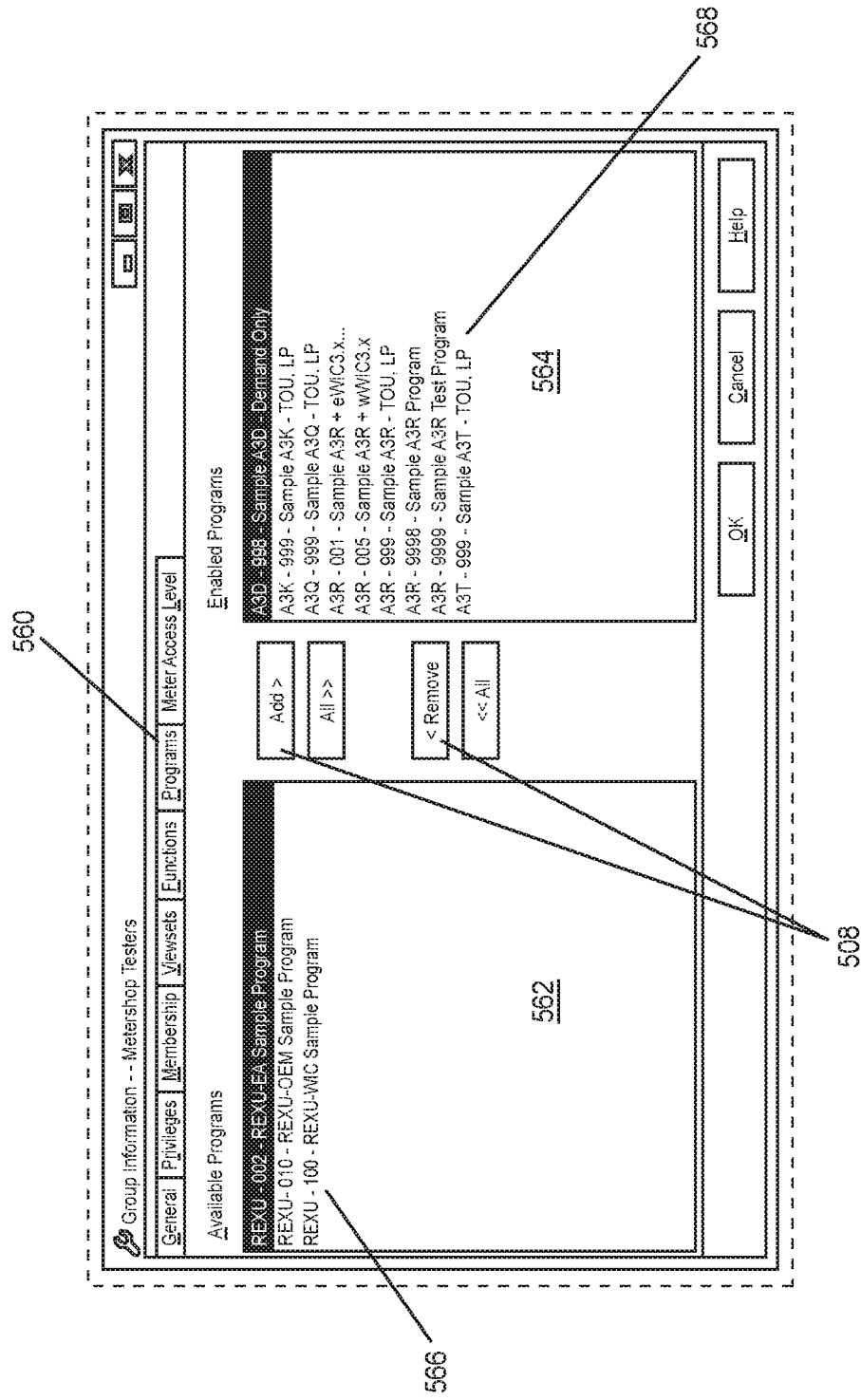
FIG. 9 illustrates another exemplary computer user interface for the administrator station according to an embodiment of the disclosure.

The authorized Programs for a user group may be selected and customized to control how the user group, user, and mobile tool interact with a meter. FIG. 9 illustrates a user interface 560 to select the authorized Programs for a Metershop Testers user group. The user interface has a first window 562 that displays available Programs 566, a second window 564 that displays the Programs enabled for the user group 568, and buttons 508 to add or remove Programs for the user group.

Figure 10:
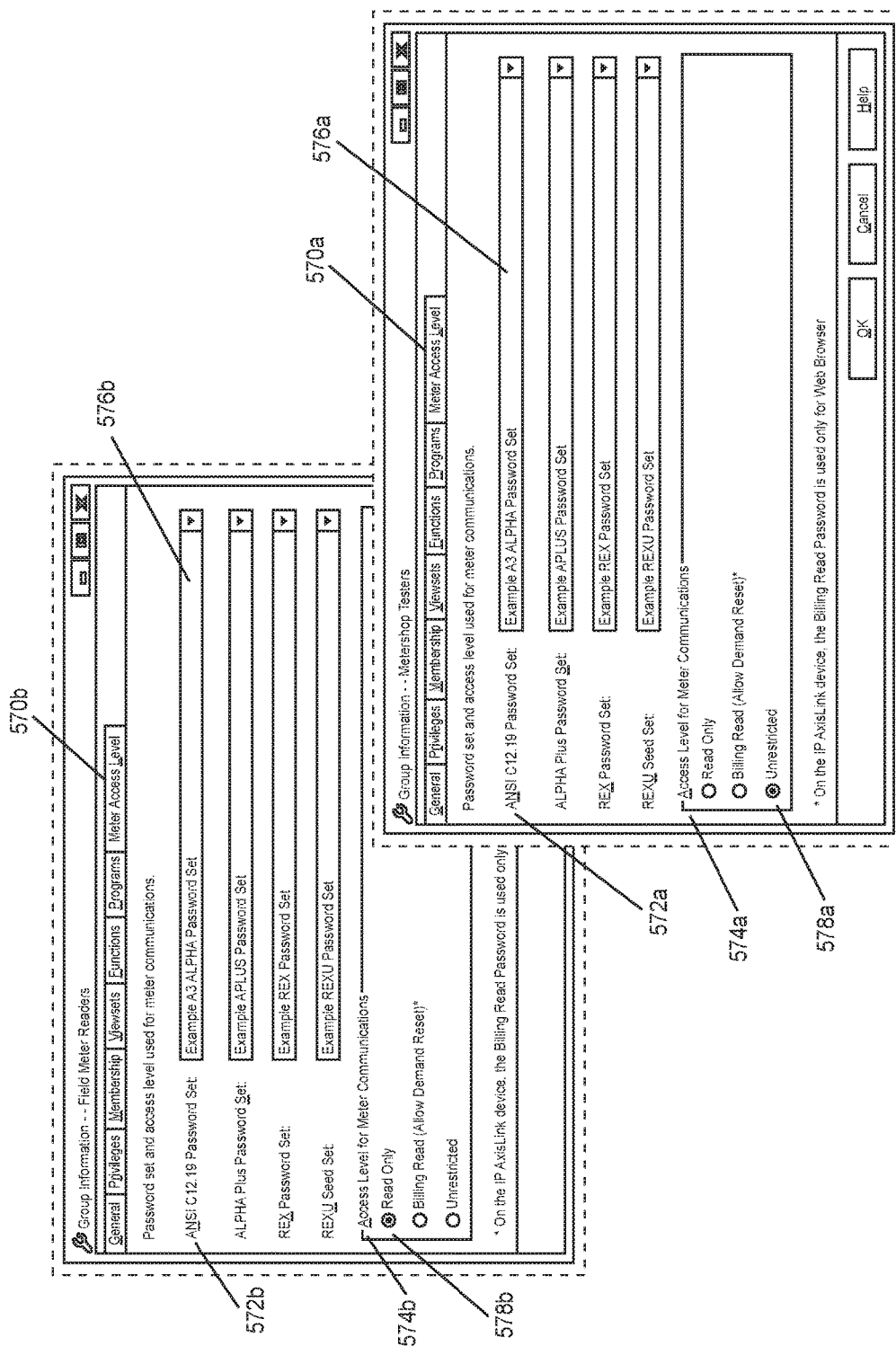
FIG. 10 illustrates another exemplary computer user interface for the administrator station according to an embodiment of the disclosure.

The meter password sets and meter access level for a user group may be selected and customized to control how the user group, user, and mobile tool interact with a meter. FIG. 10 illustrates examples of user interfaces 570a, 570b to define the meter password sets and meter access level for two different user groups—Field Meter Readers and Metershop Testers. The user interface 570a, 570b includes a series of drop downs 576a, 576b to define password sets for exemplary data and meters 572a, 572b. In addition, the user interface 570a, 570b provides a series of radio buttons 578a, 578b to define the access level for meter communications 574a, 574b. A password set consists of the passwords required for each level of access that determines how the user supplying the password can interact with the meter. FIG. 10 identifies three exemplary meter access levels—Read Only, Billing Read, and Unrestricted. Read Only passwords allow only reading of the meter without the ability to write any table or parameter to the meter. Billing Read passwords allow reading the meter, synchronizing the meter time, and performing a demand reset. Unrestricted passwords allow reading the meter and writing Programs and parameters to the meter. As shown, the Field Meter Readers and Metershop Testers are assigned the same password or seed sets for ANSI C12.19 data tables and exemplary ALPHA Plus, REX, and REXUniversal meters. However, the user groups have different levels of access for meter communication. The Field Meter Readers have "Read Only" access 578b, whereas the Metershop Testers have "Unrestricted" meter communication access 578a.

Figure 11:
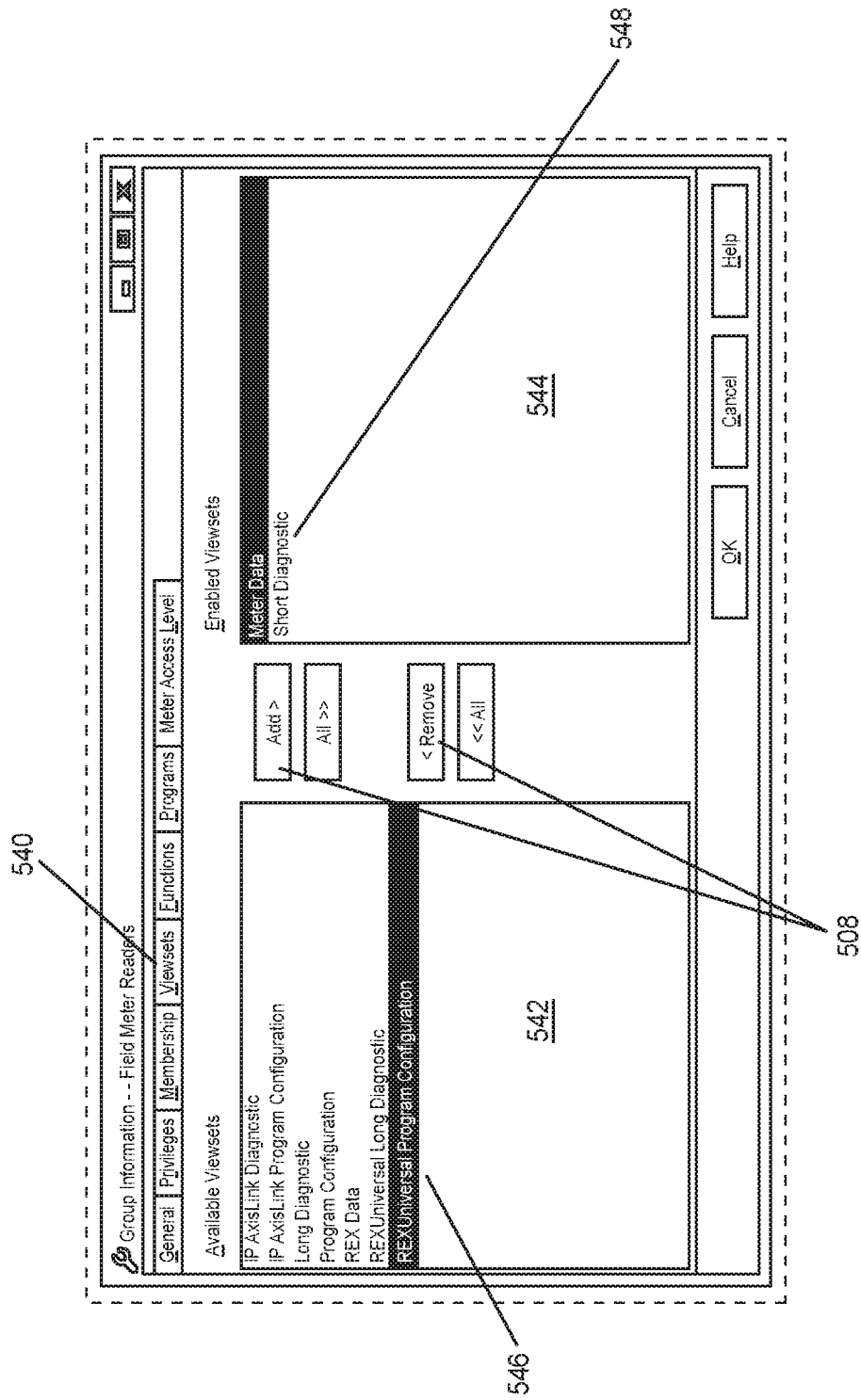
FIG. 11 illustrates another exemplary computer user interface for the administrator station according to an embodiment of the disclosure.

The authorized viewsets for a user group may be selected and customized to control the list of views available to display meter data in the mobile tool for a user group and user. FIG. 11 illustrates a user interface 540 to select the authorized viewsets for a Field Meter Readers user group. The user interface has a first window 542 that displays available viewsets 546, a second window 544 that displays the viewsets enabled for the user group 548, and buttons 508 to add or remove viewsets for the user group.

In one embodiment, an administrator may use the administrator station to create a list of meters and their connection parameters. The list may be synchronized to the mobile tool so that the mobile user has a defined a list of meters that require service or installation operations. An administrator may also create consolidated reports for meter data that has been read by the mobile tool in the field, for operation logs data from the mobile tool, and geographical location reports that report the location of the meters that were serviced by the mobile tool. The administrator station may also connect to other meter system management software applications to retrieve a list of meters and their communication parameters.

Figure 12:
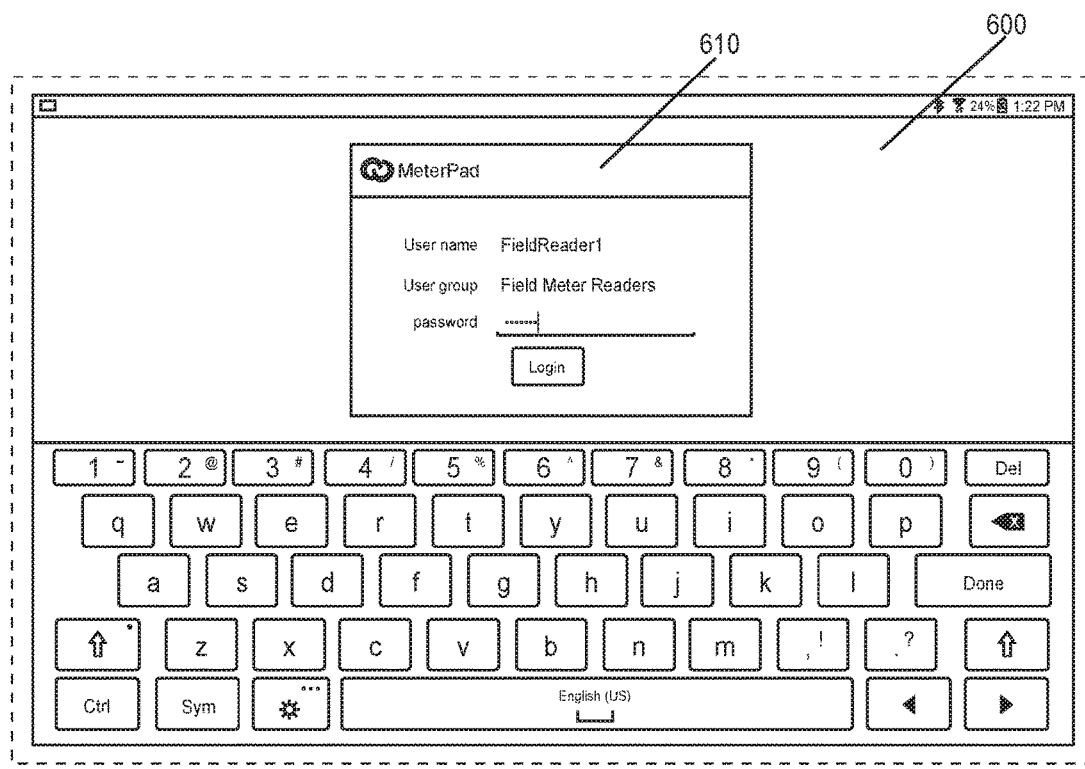
FIG. 12 illustrates an exemplary computer user interface for a mobile tool of the system of FIG. 3, according to an embodiment of the disclosure.

FIGS. 12, 13A, and 14-17 illustrate exemplary embodiments of a mobile tool user interface displayed on a mobile device. FIG. 12 illustrates one embodiment of a mobile tool user interface login screen that may appear when the mobile app is launched on the mobile device. The login screen contains a login dialogue box 610 for entering user credentials (e.g., user name and password). As shown, the login dialog box 610 contains user credentials for user "FieldReader1," who is assigned to the "Field Meter Readers" user group. Referring to FIG. 4, the Field Meter Readers user group and FieldReader1 user were created on an administrator station. And as shown in FIG. 6, FieldReader1 was assigned to the Field Meter Readers user group.

Figures 13A, 13B:
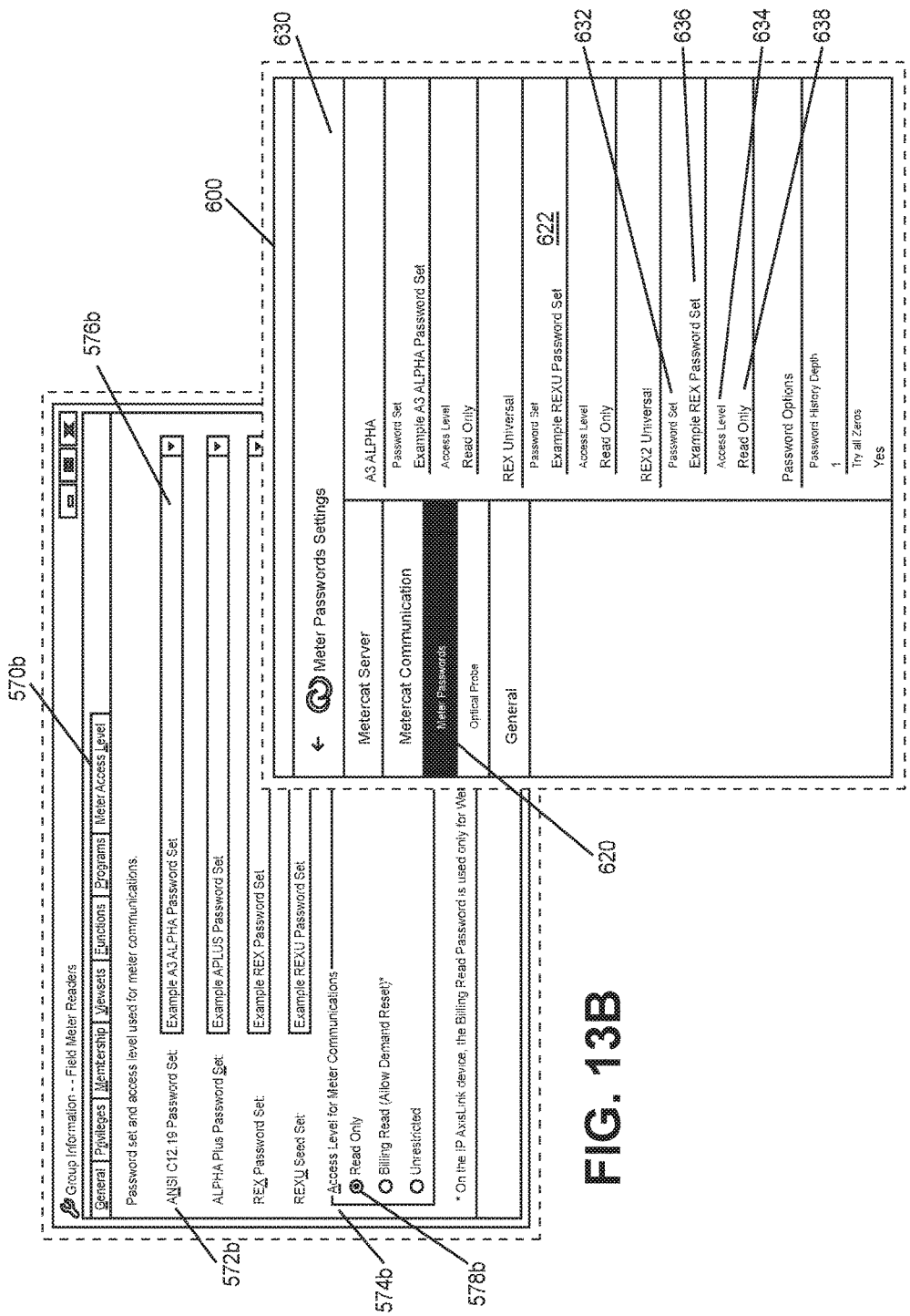
FIG. 13A illustrates another exemplary computer user interface for the administrator station according to an embodiment of the disclosure.
FIG. 13B illustrates another exemplary computer user interface for the mobile tool according to an embodiment of the disclosure that reflects the configuration settings and data illustrated in FIG. 13A.

FIG. 13A illustrates one embodiment of a mobile tool user interface 600, which includes a navigation pane 620 and first window 622. In the example of FIG. 13A, the interface 600 illustrates a meter password settings screen 630. The first window 622 displays meter password settings for a logged in user named FieldReader1. Window 622 displays the FieldReader1 user's authorized meter password sets 636 and meter access level 638 for the exemplary A3 ALPHA, REXUniversal, and Rex2 meters. FIG. 13B reproduces the administrator station meter access level user interface 570b for the Field Meter Readers user group shown in FIG. 10. As can be seen, the Field Meter Readers user group authorized password sets 576b and meter access level 578b defined using the administrator station are configured on the FieldReader1 user's mobile app password sets 636 and access level 638. Accordingly, FIGS. 13A-13B demonstrate an example of the administrator station configuring a user's mobile tool based on that user's user group.

Figure 14:
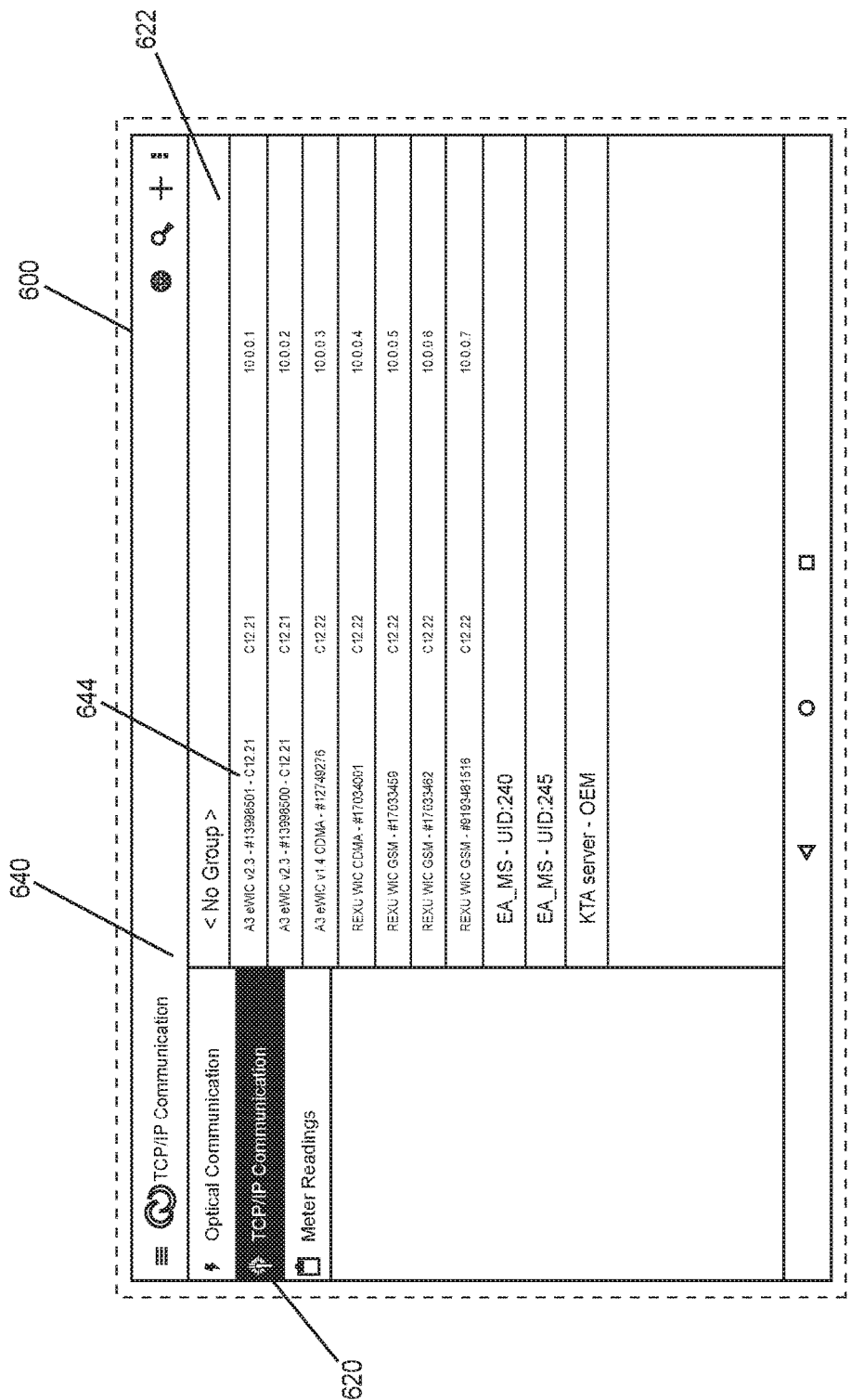
FIG. 14 illustrates another exemplary computer user interface for the mobile tool according to an embodiment of the disclosure.

FIG. 14 illustrates one embodiment of a user interface screen 640 of the mobile tool user interface 600 that may be used for connecting to meters and displaying meter data. The interface screen 640 has a navigation pane 620 and a display window 622. As discussed above, the mobile tool may support one or more communication channels and protocols to connect to meters. The example user interface screen of FIG. 14 is designed for connection to meters via TCP/IP. Window 622 contains a list of meters 644 capable of establishing a TCP/IP connection. In one embodiment, a user may select a meter to connect to via TCP/IP by touching the mobile device screen at the desired meter name in the list of meters 644.

It is desirable for a mobile tool that wants to read/write any data from/to a meter, or perform any control action (e.g. execute a meter procedure) to be authenticated by the meter. The meter may allow read/write or control operations only after the authentication is successful. The details of the authentication process may vary depending on the specific protocol used, but one piece of information that is typically used to authenticate is the meter password. If the meter password provided by the client matches the active password in the meter, then the meter may allow access according to the meter access level associated with the password. For example, if a mobile tool provides a read-only password when authenticating to a meter, then the meter will allow read-only access if the password matches the value in the meter, and any write attempt will fail in this case.

After the mobile user initiates a connection to a meter by way of a supported communication channel and the mobile tool is authenticated by the meter, the meter communicates with the device and reports the relevant identification data of the connected meter. The user may then select from a list of available Functions that can be executed against the connected meter. Only the Functions that are authorized by the administrator are visible to the mobile user. In an alternative embodiment, the mobile tool may display only the authorized Functions that are applicable to the specific meter family and/or type.

Figure 15:
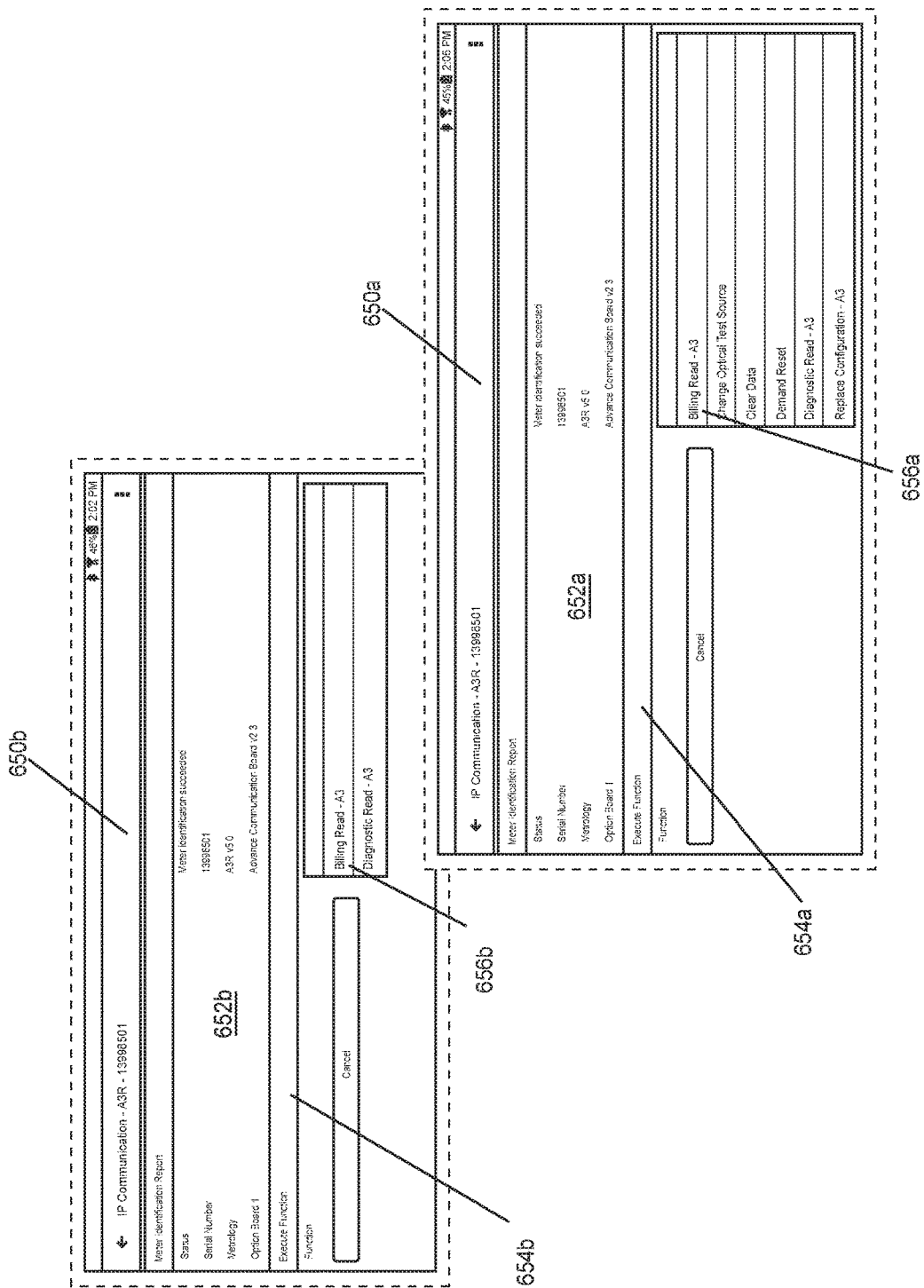
FIG. 15 illustrates another exemplary computer user interface for the mobile tool according to an embodiment of the disclosure.

FIG. 15 illustrates two different user interface screens 650a, 650b of the mobile tool user interface 600, in accordance with one embodiment thereof. Each of the screens 650a, 650b has a first window 652a, 652b displaying a connected meter identification report and a second window 654a, 654b containing a drop-down box 656a, 656b identifying authorized Functions. The two examples shown in FIG. 15 reflect the Functions assigned to the Field Meter Readers and Metershop Testers user groups, respectively, illustrated in the FIG. 8 administrator station user interface. Specifically, the Functions authorized in the drop-down box 656b reflect the Functions assigned to the Field Meter Readers user group in the second window 554b of the administrator station user interface screen depicted in FIG. 8. Similarly, the Functions authorized in drop-down box 656a of FIG. 15 are the Functions assigned to the Metershop Testers user group in the second window 554a of the administrator station user interface depicted in FIG. 8.

In one embodiment, the mobile user selects an authorized Function and starts its execution. The function progress is displayed and, at completion, a report is generated. Two exemplary types of Functions include Read Functions, which read and save data from a meter, and Configuration Functions, which set specific configuration parameters in a meter. The mobile tool may save meter data acquired by Read Functions ("meter readings") in the mobile device memory.

Other exemplary Functions that may be executed by the mobile tool include: installation (Change Out Gatekeeper, Register Edit, Clear Data, Change Time); maintenance (Upgrade Meter Firmware); service (Connect Service, Disconnect Service, Demand Reset, Test Mode On/Off); configuration (Program, Replace Configuration); and diagnostics (Diagnostic Read, Billing Read, Poll Instrumentation).

FIG. 16 illustrates one embodiment of a user interface screen 660 of the mobile tool user interface 600 that may be used to display meter readings. As shown, the interface screen 660 includes a window 662 containing a list of meters with available readings 664, and indicators 666, 668 identifying whether meter location information and a meter photograph, respectively, are included in the meter reading data.

Figure 17:
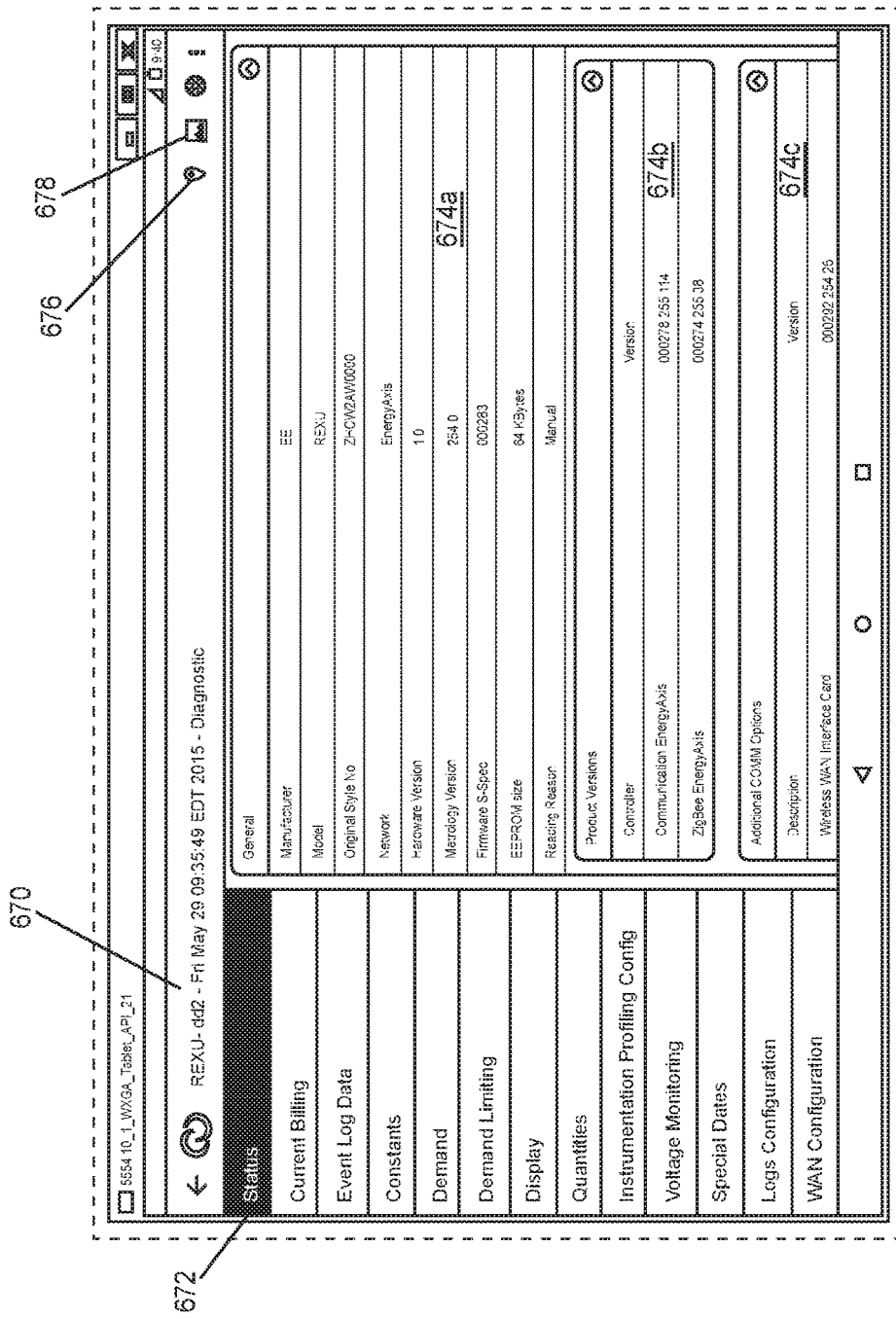
FIG. 17 illustrates another exemplary computer user interface for the mobile tool according to an embodiment of the disclosure.

In one embodiment, the user may select a meter reading from a list of available readings and open it. FIG. 17 illustrates one embodiment of a user interface screen 670 of the mobile tool user interface 600 displaying the detailed meter data. The user interface screen 670 includes a navigation pane 672 showing a list of available views, meter data information windows 674a, 674b, 674c, and indicators 676, 678 that identify whether meter location information and a meter photograph, respectively are included in the meter data. As shown, the navigation pane 672 displays a list of available views (viewsets), which are configured by an administrator using an administrator station (e.g., using the administrator station user interface screen 540 shown in FIG. 11).

The mobile tool is able to leverage the capabilities and features of the mobile device to provide enhanced meter information and user interaction that may not be possible with legacy handheld devices. For example, the mobile tool may allow for using the mobile device camera to take a photograph and attach it to the meter reading data. Further, the photograph may be annotated to draw attention to specific areas. This feature may be useful in troubleshooting a meter problem in the field or meter shop. A mobile user may take a photograph of the meter, draw on the photograph to identify a specific problem or area of interest, attach the photograph to the meter data, and synchronize the mobile with the server to store the photograph and meter data on the database. Then an administrator in a remote location may use an administrator station to access the database, view the meter data and annotated photograph, and provide assistance or feedback regarding the meter problem.

The mobile tool may also allow for attaching meter location information to the meter reading data. In one embodiment, the mobile tool has a general Location Services setting that allows the user to enable/disable the usage of the mobile device location services, which may include GPS capabilities.

The mobile tool may also be configured to record operational logs, which capture the operations that the mobile user has performed during field service. The logs may be securely transmitted to the server and stored on the database so that may be reviewed by an administrator for troubleshooting or auditing purposes. On the administrator station, the administrator may view a list of the meter readings performed in the field by the mobile users and open them to review the detailed data.

The meter reading data, including any photograph, location information, operational log, or other data generated by the mobile tool may be securely transmitted to the server and stored on the database when the mobile tool synchronizes to the server.

Figure 18:
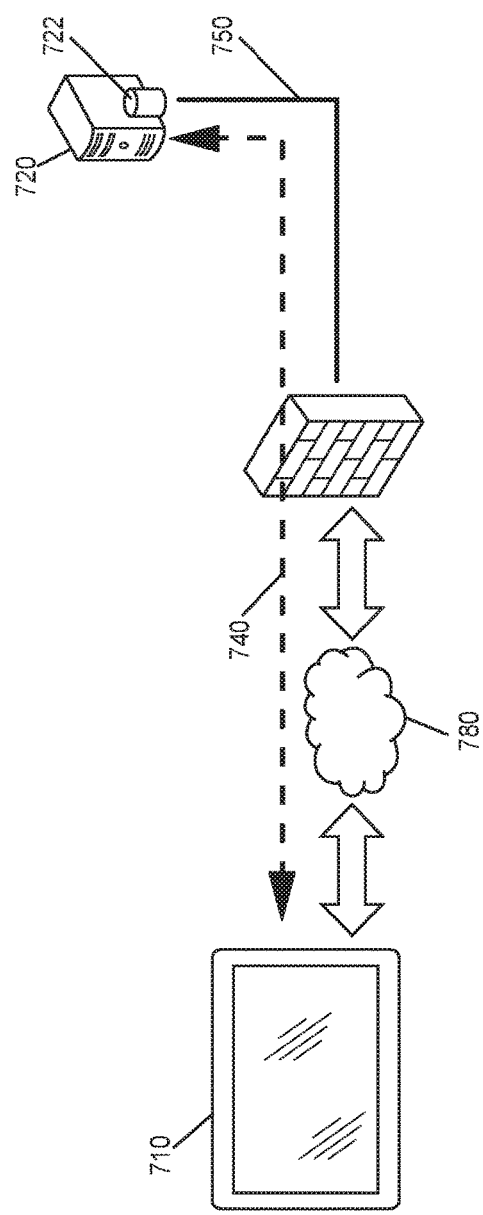
FIG. 18 is a schematic diagram illustrating a connection between a mobile tool and a server according to an aspect of the disclosure.
Figure 19:
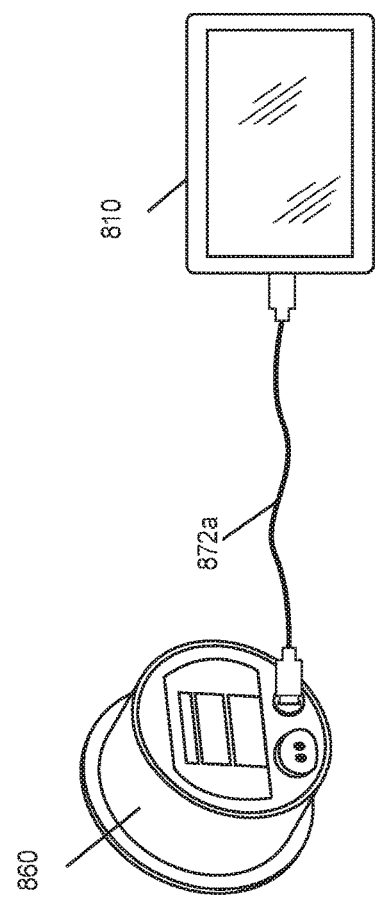
FIG. 19 is a schematic diagram illustrating a connection between a mobile tool and a meter according to an aspect of the disclosure.

FIGS. 18-19 illustrate further details of an exemplary embodiment of the secure and configurable mobile tool system. In the embodiment illustrated, an administrator uses an administrator station to create a set of user groups and users. The administrator configures the login credentials for the users and the user group membership. The administrator defines the user groups' user group authorization profiles by setting privileges and authorized data for each group. The administration settings, including the user group authorization profiles containing configuration settings and related data, are stored in the database 722. The administrator communicates the login-credentials to the users.

The server 720 is connected to a communication network 750. It includes a database 722 and is configured to establish a secure communication channel 740. The database 722 is configured to store configuration settings and related data created by an administrator using the administrator station and meter data collected and generated by the mobile tool. The server 720 waits for a connection from a mobile user (mobile tool).

In one embodiment, the mobile tool may be implemented in the form of an application that a mobile user may download and install from an available application store, such as Google Play or another similar application store service. Once the mobile app is installed, the user may launch the mobile app on the mobile device 710. This causes the mobile app to connect to the server 720 and to authenticate the user credentials input by the mobile user (which user credentials were established for the user by the administrator). Upon successful user authentication, the mobile tool synchronizes with the server 720. During synchronization, the server 720 determines the mobile tool user's user group authorization profile and retrieves configuration settings and related data from the database 722 based on the determined user group authorization profile. The server then transmits the configuration settings and related data (e.g., meter passwords; Functions; meter Programs and related Components) to the mobile tool via the secure communication channel 740. The server thereby automatically configures the mobile tool and enables an administrator to control the functionality of the mobile tool and how it can interact with a meter.

Referring to FIG. 19, after synchronizing with the server, the mobile tool can be used to perform installation, maintenance, service, diagnostics and configuration of a meter 860. As mentioned above, the mobile tool supports one or more communication channels and protocols (e.g., TCP/IP, optical probe via USB/Bluetooth interface) that enable it to connect to the meter 860. The mobile tool in FIG. 19 illustrates an exemplary optical probe 872a via a USB interface connection to a meter 860. Once connected to the meter 860, the functionality of the mobile tool is limited by the user group authorization profile assigned to the particular user of the mobile tool by an administrator. Some typical operations performed by the mobile tool are: read meter data for diagnostics purposes, save the meter data to a file, display the meter data, program or configure a meter, and/or test the meter connectivity to its AMI network.

When an administrator changes the user group authorization profile (e.g. authorizes an additional meter Program for the user group) the changes are transferred to the mobile tool the next time the mobile tool synchronizes with the server 820. The mobile user can synchronize with the server 820 at any time. After the synchronization is completed, the functionality of the mobile tool is updated according to the latest user group authorization profile. When the mobile tool synchronizes with the server, data that has been read from meters 860 and stored locally on the mobile device 810 may be transferred to the server 820 and stored in the database 822, where it may be reviewed by an administrator using an administrator station.

Some advantages of the mobile tool system described herein may include security and usability. The mobile tool system may improve security by allowing administrators to customize the functionality of the mobile tool to fit the specific operations that the mobile user performs. The mobile tool communicates to the server via a secure communication channel (e.g., HTTPS protocol) which guarantees the confidentiality and integrity of the data communicated between the mobile tool and the server. In addition, the secure mobile tool-server communication allows the mobile users to receive and transmit data to a remote location (e.g. a Utility office), without the need to physically visit the remote location or require any assistance from the administrator. The mobile tool may simplify operation by allowing the mobile user to only see the functionality that has been enabled, which may reduce training needs. The mobile solution may also reduce errors in the field where a user performs the wrong operations.

Figure 20:
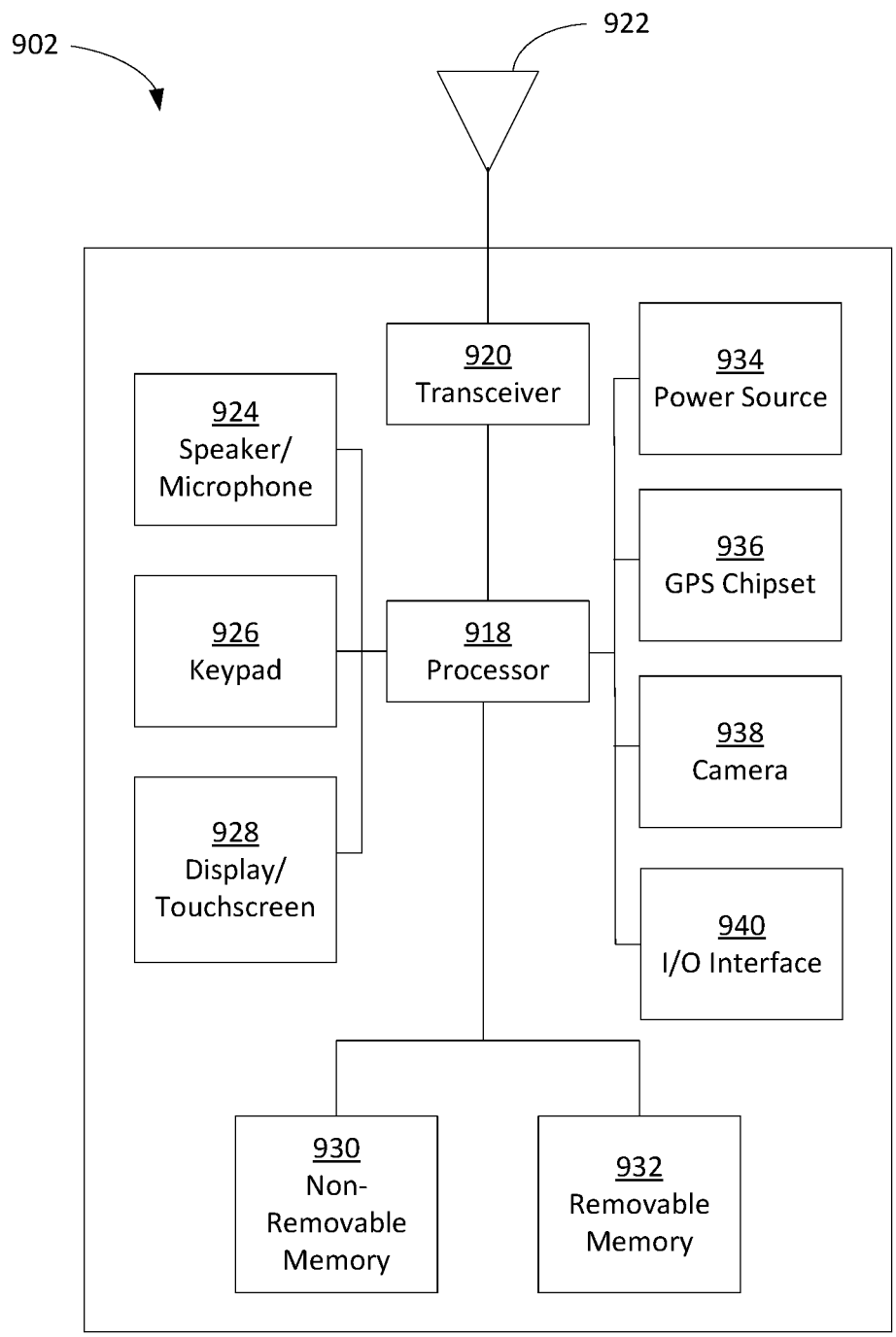
FIG. 20 illustrates a schematic of a mobile device according to an aspect of the disclosure.

FIG. 20 is a block diagram of an exemplary mobile device 902, such as a tablet computer or smartphone, in which the various embodiments and aspects of the present disclosure may be embodied. As shown in FIG. 20, the example mobile device 902 may include a processor 918, a transceiver 920 (also referred to herein as communication module), an antenna 922, a speaker/microphone 924, a keypad 926, a display/touchscreen 928, non-removable memory 930, removable memory 932, a power source 934, a global positioning system (GPS) chipset 936, and a camera 938, a I/O interface 940 (e.g., universal serial bus (USB) or a proprietary computer bus such as an Apple Lightning connector), and a barcode scanner (not shown). It will be appreciated that the mobile device 902 may include any sub-combination of the foregoing elements while remaining consistent with an embodiment.

The processor 918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the mobile device 902 to operate in a wireless environment. The processor 918 may be coupled to the transceiver 920, which may be coupled to the antenna 922. While FIG. 20 depicts the processor 918 and the transceiver 920 as separate components, it will be appreciated that the processor 918 and the transceiver 920 may be integrated together in an electronic package or chip.

The antenna 922 may be configured to transmit signals to, or receive signals from, a wireless access point, cellular base station, Bluetooth device, or the like. In addition, although the antenna 922 is depicted in FIG. 20 as a single element, the mobile device 902 may include any number of transmit/receive elements 922. More specifically, the mobile device 902 may employ MIMO technology. Thus, in an embodiment, the mobile device 902 may include two or more transmit/receive elements 922 (e.g., multiple antennas) for transmitting and receiving wireless signals.

The transceiver 920 may be configured to modulate the signals that are to be transmitted by the transmit/receive element 922 and to demodulate the signals that are received by the transmit/receive element 922. As noted above, the mobile device 902 may have multi-mode capabilities. Thus, the transceiver 920 may include multiple transceivers for enabling the mobile device 902 to communicate via multiple radio technologies.

The processor 918 of the mobile device 902 may be coupled to, and may receive user input data from, the speaker/microphone 924, the keypad 926, the display/touchscreen 928, the I/O interface 940, and/or the barcode scanner. The processor 918 may also output user data to the speaker/microphone 924, the keypad 926, the display/touchscreen 928, and/or the I/O interface 940. In addition, the processor 918 may access information from, and store data in, any type of suitable memory, such as the non-removable memory 930 and/or the removable memory 932. The non-removable memory 930 may include random-access memory (RAM), read-only memory (ROM), a hard disk, or any other type of memory storage device. The removable memory 932 may include a memory stick, a secure digital (SD) memory card, or the like.

The processor 918 may receive power from the power source 934, and may be configured to distribute and/or control the power to the other components in the mobile device 902. The power source 934 may be any suitable device for powering the mobile device 902.

The processor 918 may also be coupled to the GPS chipset 936, which may be configured to provide location information (e.g., longitude and latitude) regarding the current location of the mobile device 902. The processor 918 may further be coupled to a camera device for obtaining images or video.

Figure 21:
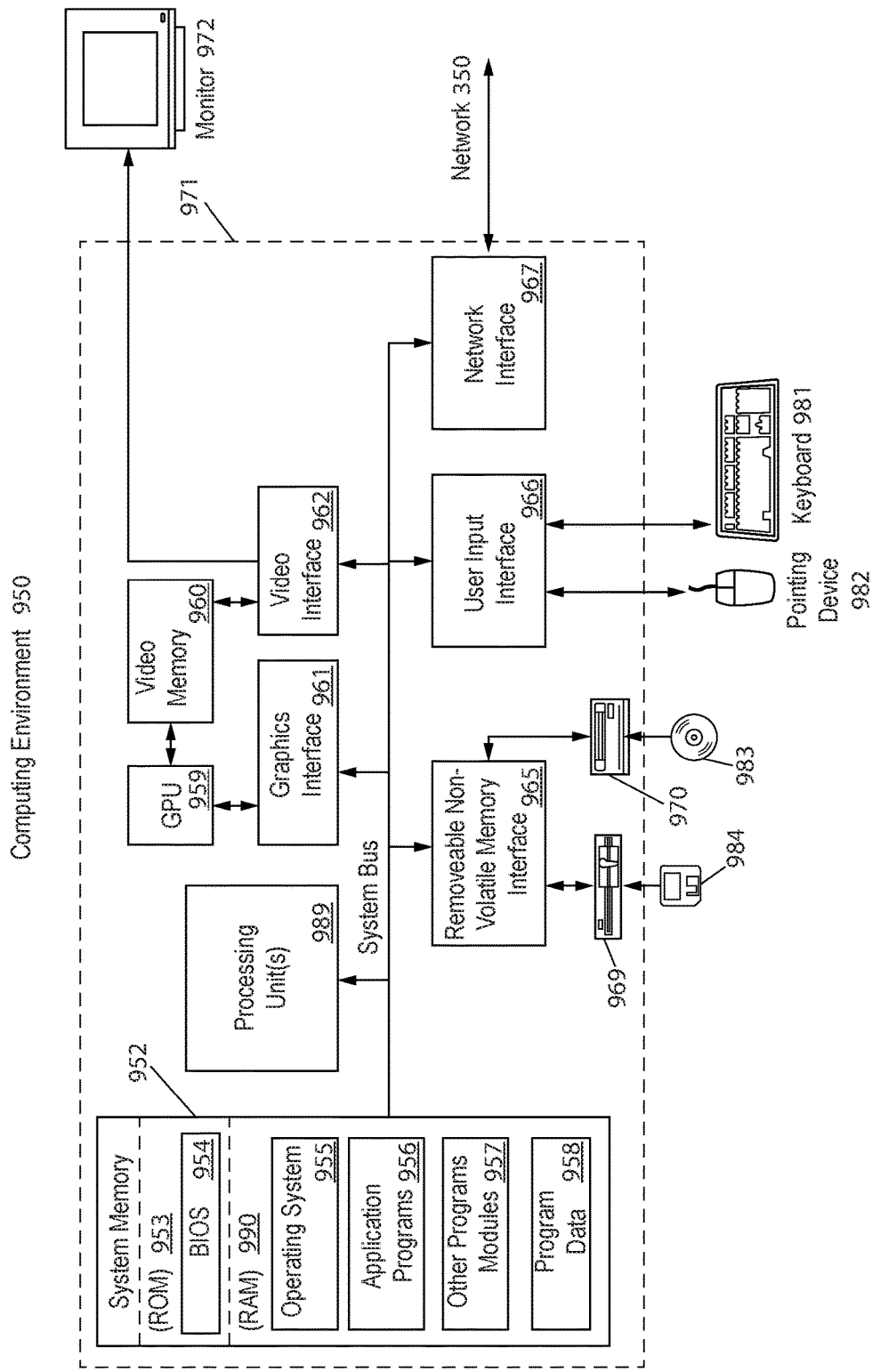
FIG. 21 illustrates a schematic of a computing environment according to an aspect of the disclosure.

FIG. 21 is an example embodiment of a computing environment 950 of which various aspects of the metering system 110 and mobile tool system 300 could be implemented. For example, the computing environment 950 may be used to implement the head-end/data collection server 206, server 320 and/or administrator stations 330a, 330b, 330c (and associated functionality of FIGS. 4-11), or any other aspect of the disclosed systems that require computing. The computing environment 950 is only one example of a suitable computing environment and is not intended to suggest any limitation as to the scope of use or functionality of the presently disclosed subject matter. Neither should the computing environment 950 be interpreted as having any dependency or requirement relating to any one or combination of components illustrated in FIG. 21. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since the state of the art has evolved to a point where there is little difference between hardware, software, or a combination of hardware/software, the selection of hardware versus software to effectuate specific functions is a design choice left to an implementer. More specifically, a software process can be transformed into an equivalent hardware structure, and a hardware structure can itself be transformed into an equivalent software process. Thus, the selection of a hardware implementation versus a software implementation is one of design choice and left to the implementer.

In FIG. 21, the computing environment 950 comprises a computer 971. The computer 971 comprises a processing unit(s) 989, which may comprise a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processing unit(s) 989 may perform signal coding, data processing, power control, input/output processing, and/or any other functionality that enables the computing environment 950 to operate in accordance with its intended functionality. The computer 971 may further comprise a graphics interface, graphics processing unit (GPU), video memory 960, and video interface. These components may cooperate to display graphics and text on a video monitor, such as monitor 972. For example, the graphical user interfaces illustrated in FIGS. 4-11 may be displayed by these components on monitor 972. Processing unit(s) 989 and GPU 959 may receive, generate, and process data related to the apparatuses, methods and systems disclosed herein.

In operation, processing unit(s) 989 fetches, decodes, and executes instructions, and transfers information to and from other resources via the computer's main data-transfer path, system bus 951. Such a system bus connects the components in computer 971 and defines the medium for data exchange. System bus 951 typically includes data lines for sending data, address lines for sending addresses, and control lines for sending interrupts and for operating the system bus. An example of such a system bus 951 is the PCI (Peripheral Component Interconnect) bus. A system memory 952 includes computer storage media in the form of volatile and/or nonvolatile memory such as read only memory (ROM) 953 and random access memory (RAM) 990. A basic input/output system 954 (BIOS), containing the basic routines that help to transfer information between elements within computer 971, such as during start-up, is typically stored in ROM 953. RAM 990 typically contains data and/or program modules that are immediately accessible to and/or presently being operated on by processing unit 989. By way of example, and not limitation, FIG. 21 illustrates operating system 955, application programs 956, other program modules 957, and program data 958.

The computer 971 may also include other removable/non-removable, volatile/nonvolatile computer storage media. By way of example only, the computer 971 may include a hard disk drive (not shown) that reads from or writes to non-removable, nonvolatile magnetic media, a magnetic disk drive 969 that reads from or writes to a removable, nonvolatile magnetic disk 984, and an optical disk drive 970 that reads from or writes to a removable, nonvolatile optical disk 983 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Magnetic disk drive 969 and optical disk drive 970 are typically connected to the system bus 951 by a removable memory interface, such as interface 965. The drives and their associated computer storage media discussed above and illustrated in FIG. 21, provide storage of computer readable instructions, data structures, program modules and other data for the computer 971.

A user may enter commands and information into the computer 971 through input devices such as a keyboard 981 and pointing device 982, commonly referred to as a mouse, trackball or touch pad. Other input devices (not shown) may include a microphone, joystick, game pad, satellite dish, scanner, or the like. These and other input devices are often connected to the processing unit 989 through a user input interface 966 that is coupled to the system bus, but may be connected by other interface and bus structures, such as a parallel port, game port or a universal serial bus (USB). The computer may connect to a local area network or wide area network, such as network 350, through a network interface or adapter 967.

As is apparent from the embodiments described herein, all or portions of the apparatuses, systems, methods, processes, and aspects disclosed herein may be embodied in the form of computer executable instructions (i.e., program code) stored on a computer-readable storage medium, which instructions, when executed by a processor (e.g., processor 205' of meter 114, processor 918 of mobile device 902, and processing unit(s) 989 of computing environment 950), perform and/or implement the apparatuses, methods, systems and aspects described herein. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer. These storage media may be integrated into a processor or may be separate components within a device. As used herein, the term "computer readable storage media" or the like does not include signals.

While example embodiments and advantages have been described above, modifications and variations may be made without departing from the principles described above and set forth in the following claims. Accordingly, reference should be made to the following claims as describing the scope of the present invention.

What is claimed:

1. An administrator station for establishing a plurality of user group authorization profiles, each of the user group authorization profiles being associated with a different set of configuration settings and related data for mobile tools that determine how the mobile tools function and interact with meters when used for performing at least one operation of installation, maintenance, service, diagnostics and configuration of the meters, the administrator station comprising:
   a processor and a memory, the memory storing computer-executable instructions that when executed by the processor, cause the administrator station to:
      receive input for:
         at least one user, including a username and a password for the at least one user;
         at least one user group, including user group name, a user group membership information identifying the at least one user, privileges assigned to the at least one user group, and authorized data for the at least one user group; process the input;
      generate one of the plurality of user group authorization profiles based on the user group name, the user group membership information, privileges, and authorized data;
      store the one of the plurality of user group authorization profiles in a database; and
      establish a connection, via said mobile tools, with at least one meter of said meters for performing the at least one operation of installation, maintenance, service, diagnostics and configuration of said meters based at least on the generated one of the plurality of user group authorization profiles.

2. The administrator station of claim 1, wherein the authorized data further comprises at least one of a function, a meter program, a viewset, a meter password set, or meter access level.

3. The administrator station of claim 1, wherein the privileges further comprise at least one of create programs, edit programs, view programs, authorize programs, create functions, edit functions, view functions, authorize functions, create viewsets, edit viewsets, view viewsets, authorize viewsets, create meter password sets, edit meter password sets, view meter password sets, authorize meter password sets, create meter access level, edit meter access level, view meter access level, or authorize meter access level.

4. The administrator station of claim 1, wherein the computer executable instructions executed by the processor further cause the administrator station to read data stored in the database.

5. The administrator station of claim 4, wherein the data comprises at least one of meter data for at least one meter, geographical location data for at least one meter, or operational log data from at least one mobile tool.

6. The administrator station of claim 1, wherein the computer executable instructions executed by the processor further cause the administrator station to connect to at least one meter system management application.

7. The administrator station of claim 6, wherein the computer executable instructions executed by the processor further cause the administrator station to retrieve information for at least one meter from the at least one meter system management application.

8. A method for establishing a plurality of user group authorization profiles, each of the user group authorization profiles being associated with a different set of configuration settings and related data for mobile tools that determine how the mobile tools function and interact with meters when used for performing at least one operation of installation, maintenance, service, diagnostics and configuration of the meters, the method comprising:
receiving, by an apparatus, input for:
at least one user, including a username and a password for the at least one user;
at least one user group, including a user group name, user group membership information identifying the at least one user, privileges assigned to the at least one user group, and authorized data for the at least one user group;
processing, by the apparatus, the input;
generating, by the apparatus, one of the plurality of user group authorization profiles based on the user group name, the user group membership information, privileges, and authorized data;
storing, by the apparatus, the one of the plurality of user group authorization profiles in a database; and
establishing a connection, via said mobile tools, with at least one meter of said meters for performing the at least one operation of installation, maintenance, service, diagnostics and configuration of said meters based at least on the generated one of the plurality of user group authorization profiles.

9. The method of claim 8, wherein the authorized data further comprises at least one of a function, a meter program, a viewset, a meter password set, or meter access level.

10. The method of claim 8, wherein the privileges further comprise at least one of create programs, edit programs, view programs, authorize programs, create, edit functions, view functions, authorize functions, create viewsets, edit viewsets, view viewsets, authorize viewsets, create meter password sets, edit meter password sets, view meter password sets, authorize meter password sets, create meter access level, edit meter access level, view meter access level, or authorize meter access level.

11. The method of claim 8, further comprising reading, by the apparatus, data stored in the database.

12. The method of claim 11, wherein the data comprises at least one of meter data for at least one meter, geographical location data for at least one meter, or operational log data from at least one mobile tool.

13. The method of claim 8, further comprising connecting, by the apparatus, to at least one meter system management application.

14. The method of claim 13, further comprising retrieving, by the apparatus, information for at least one meter from the at least one meter system management application.

15. A non-transitory computer-readable storage medium storing instructions that cause a processor executing the instructions to effectuate operations, the operations comprising:
receiving input for:
at least one user, including a username and a password for the at least one user;
at least one user group, including a user group name, user group membership information identifying the at least one user, privileges assigned to the at least one user group, and authorized data for the at least one user group;
processing the input;
generating one of a plurality of user group authorization profiles for the at least one user group based on the user group name, the user group membership information, privileges, and authorized data;
storing the one of the plurality of user group authorization profiles in a database; and
establishing a connection, via mobile tools, with at least one meter for performing at least one operation of installation, maintenance, service, diagnostics and configuration of said meter based at least on the generated one of the plurality of user group authorization profiles.

16. The non-transitory computer-readable storage medium of claim 15, wherein the operations further comprise reading data stored in the database.

17. The non-transitory computer-readable storage medium of claim 16, wherein the data comprises at least one of meter data for at least one meter, geographical location data for at least one meter, or operational log data from at least one mobile tool.

18. The non-transitory computer-readable storage medium of claim 15, wherein the operations further comprise connecting to at least one meter system management application.

19. The non-transitory computer-readable storage medium of claim 18, wherein the operations further comprise retrieving information for at least one meter from the at least one meter system management application.

* * * * *